(12) United States Patent
Babu et al.

(10) Patent No.: US 9,819,815 B1
(45) Date of Patent: Nov. 14, 2017

(54) SURFACE DISPLAY ASSEMBLY HAVING PROXIMATE ACTIVE ELEMENTS

(75) Inventors: Amish Rajesh Babu, Sunnyvale, CA (US); John E. Johnston, Redwood City, CA (US); Toby Warren Smith, San Jose, CA (US); Shyeu-Yang Wang, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 992 days.

(21) Appl. No.: 12/823,746

(22) Filed: Jun. 25, 2010

Related U.S. Application Data

(60) Provisional application No. 61/303,254, filed on Feb. 10, 2010.

(51) Int. Cl.
| | | |
|---|---|---|
| H04N 1/00 | (2006.01) | |
| G06F 3/041 | (2006.01) | |
| G06F 3/045 | (2006.01) | |
| G06F 3/01 | (2006.01) | |
| G06F 1/16 | (2006.01) | |

(52) U.S. Cl.
CPC ....... *H04N 1/00129* (2013.01); *G06F 1/1601* (2013.01); *G06F 3/016* (2013.01); *G06F 3/045* (2013.01); *G06F 3/0414* (2013.01)

(58) Field of Classification Search
None
See application file for complete search history.

(56) References Cited

U.S. PATENT DOCUMENTS

| | | | | |
|---|---|---|---|---|
| 5,854,625 | A * | 12/1998 | Frisch et al. | 345/173 |
| 7,324,093 | B1 * | 1/2008 | Gettemy et al. | 345/173 |
| 7,538,760 | B2 * | 5/2009 | Hotelling et al. | 345/173 |
| 7,653,883 | B2 * | 1/2010 | Hotelling et al. | 715/863 |
| 8,654,083 | B2 * | 2/2014 | Hotelling et al. | 345/173 |
| 2002/0031622 | A1 * | 3/2002 | Ippel et al. | 428/1.6 |
| 2003/0012936 | A1 * | 1/2003 | Draheim et al. | 428/216 |
| 2003/0090616 | A1 * | 5/2003 | Hirakawa et al. | 349/187 |
| 2003/0223185 | A1 * | 12/2003 | Doczy | G06F 1/1626 361/679.11 |
| 2004/0080267 | A1 * | 4/2004 | Cok | 313/512 |
| 2004/0214079 | A1 * | 10/2004 | Simburger | H01M 6/12 429/123 |
| 2005/0110780 | A1 * | 5/2005 | Ditzik | 345/179 |
| 2005/0185801 | A1 * | 8/2005 | McCarty et al. | 381/87 |
| 2007/0046639 | A1 * | 3/2007 | Swedin | G02F 1/13338 345/173 |
| 2008/0143683 | A1 * | 6/2008 | Hotelling | 345/173 |
| 2008/0192461 | A1 * | 8/2008 | Chien | F21S 9/02 362/183 |

(Continued)

OTHER PUBLICATIONS

Motorolla/Verizon, "Motorola Droid User Guide," 2009-2010.*

(Continued)

*Primary Examiner* — Joseph Ustaris
*Assistant Examiner* — Edemio Navas, Jr.
(74) *Attorney, Agent, or Firm* — Lee & Hayes, PLLC

(57) ABSTRACT

Presentation by a display is enhanced by placing the active elements of the display at or substantially proximate to the surface of an electronic device. A protective sheet of the display is extended to cover a front surface of the electronic device. Such placement improves image quality, reduces shadow on the display, improves spill resistance, and minimizes the overall profile of the device.

23 Claims, 19 Drawing Sheets

(56) References Cited

U.S. PATENT DOCUMENTS

| | | | | |
|---|---|---|---|---|
| 2008/0303797 | A1* | 12/2008 | Grothe | 345/173 |
| 2009/0135156 | A1* | 5/2009 | Lowles | G06F 3/044 345/174 |
| 2009/0256817 | A1* | 10/2009 | Perlin et al. | 345/174 |
| 2009/0296332 | A1* | 12/2009 | Policar | 361/679.21 |
| 2010/0097445 | A1* | 4/2010 | Hirama et al. | 348/51 |
| 2010/0162325 | A1* | 6/2010 | Bonar | 725/76 |
| 2010/0273530 | A1* | 10/2010 | Jarvis et al. | 455/566 |
| 2010/0274563 | A1* | 10/2010 | Malo et al. | 704/270.1 |
| 2010/0302201 | A1* | 12/2010 | Ritter | G06F 3/044 345/174 |
| 2010/0321305 | A1* | 12/2010 | Chang et al. | 345/173 |

OTHER PUBLICATIONS

Lin Edwards, "New multi-touch screen technology developed (w/ Video)," Jan. 12, 2010, Phys.org, (http://phys.org/news/2010-01-multi-touch-screen-technology-video.html).*

* cited by examiner

SURFACE DISPLAY ASSEMBLY HAVING PROXIMATE ACTIVE ELEMENTS

PRIORITY

The present application claims priority to U.S. Provisional Application Ser. No. 61/303,254, entitled, "Surface Display Assembly" filed on Feb. 10, 2010; which is incorporated by reference herein for all that it teaches and discloses.

BACKGROUND

Users increasingly demand devices with additional capabilities and physical configurations, such as crisp displays, touch-sensitive input devices, and unbroken flat surfaces. Users also demand these capabilities and configurations in ever smaller form factors (that is, an overall size of the device). Traditionally, incorporating such capabilities and physical configurations to an electronic device has complicated the manufacture and assembly of the device, as well as undesirably increasing the overall thickness of the device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
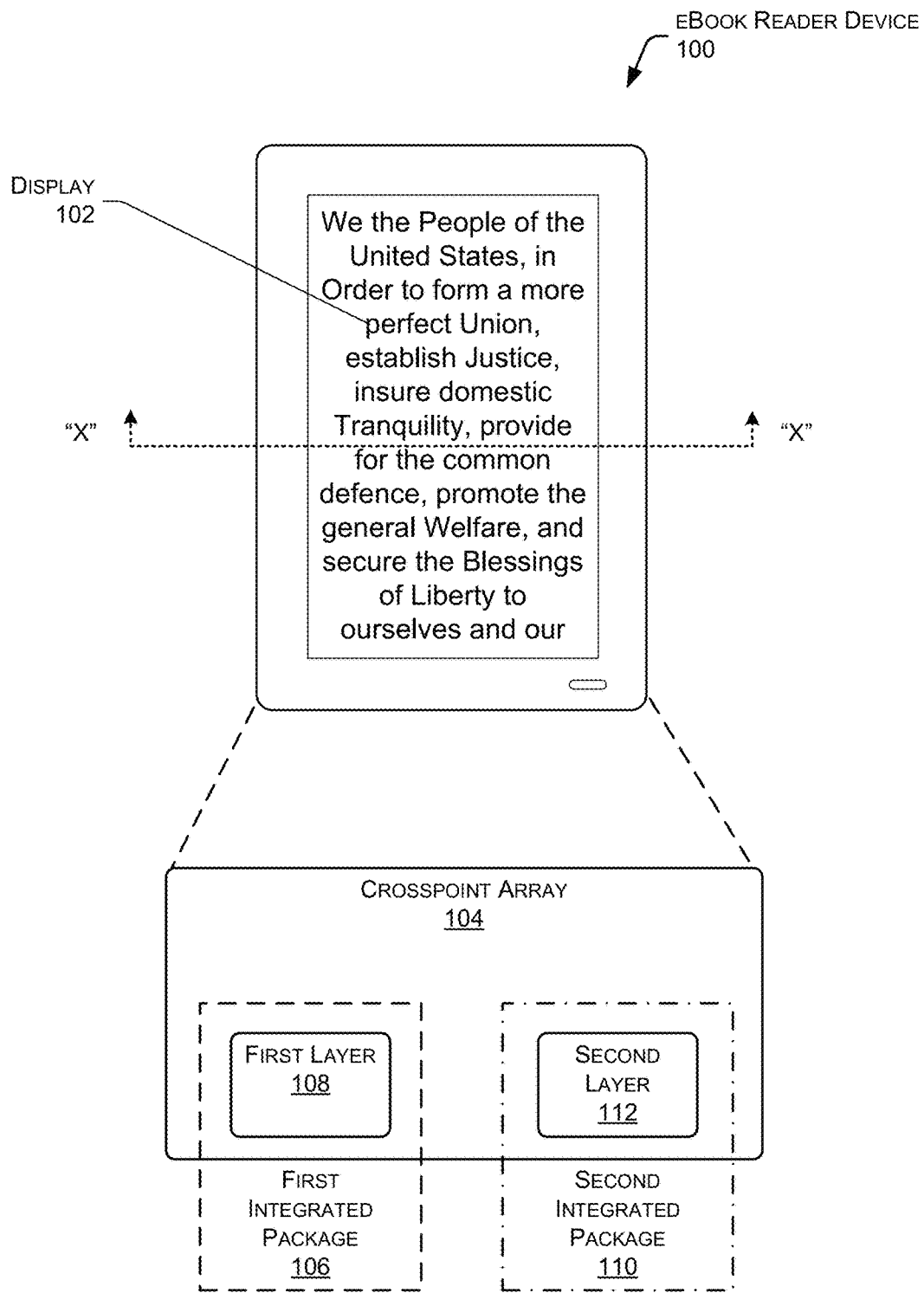
FIG. 1 depicts an illustrative electronic book ("eBook") reader device having a touch sensor comprising a crosspoint array formed by two integrated packages.

Electronic devices such as cellular phones, portable media players, tablet computers, netbooks, laptops, electronic book ("eBook") readers, and so forth, increasingly incorporate touch-sensors as input devices to enable users to control and otherwise interact with the devices as well as displays to present information to the users. Traditionally, incorporation of the touch-sensor in the electronic device adversely affects performance of the display while increasing the bulk, complexity, manufacturing costs, and so forth.

Furthermore, traditional configuration of the display within the electronic device adversely affects performance, durability, and aesthetics of the display.

This disclosure describes, in part, devices that include a touch screen having a reduced number of layers compared to traditional devices and techniques for assembling such touch-screen devices. A touch sensor may contain two or more layers. When properly positioned, these two or more layers form a crosspoint array. These layers are incorporated into one or more integrated packages containing other components. The touch-sensitive crosspoint array is formed when the portion of the device containing the one or more components with incorporated layers is assembled. By positioning the touch sensor above or below a display, a touch screen is formed.

Crosspoint arrays may include capacitive arrays, digital resistive arrays, interpolating force sensitive resistor ("IFSR") arrays, and so forth which may be used as the touch sensor. A crosspoint array, such as implemented in an IFSR array, comprises at least two layers, each layer having a series of approximately parallel conductive traces or wires. These traces or wires may be printed, deposited, etched, embedded, or otherwise placed onto a substrate. In some implementations, the two layers are arranged such that the orientation of wires in a first layer is substantially perpendicular to the orientation of wires in a second layer. Upon application of an incident force to the layers, resistance to electrical current at and around the point of force application changes. By scanning the wires and measuring these changes in resistance at junctions of the wires, a location and magnitude of force applied may be determined.

Among the implementations described below, the first layer of a crosspoint array may be integrated into the back of a display device, while the second layer of the crosspoint array may be integrated into the front of a battery pack. Upon placing the display on the battery pack during assembly, the crosspoint array is formed. Thus, no additional step is required for placement of a dedicated crosspoint array component, which simplifies assembly. Furthermore, this removes any packaging or material which would be required for handling or to act as a substrate which would otherwise be present in a dedicated crosspoint array, resulting in a slimmer profile. Thus, as described herein, a crosspoint array may be assembled without layers previously required.

This disclosure also describes, in part, a surface display assembly. The surface display assembly is configured such that the active elements of the display are brought to the front surface of the electronic device, or a position substantially proximate to the front of the electronic device. The active elements are those which create an image suitable for presentation to a user. For example, in an electrophoretic display, an active element would be an electrophoretic particle. In another example, a liquid crystal comprises an active element. Together, the active elements comprise a display layer.

Bringing the display layer as close as possible to the surface of the device provides several benefits. For instance, the electronic device may be built with a slimmer profile. This configuration also improves the prominence of material presented on the display, as well eliminates or reduces shadows created by bezels. This configuration also produce a more robust spill/splash resistant assembly that results from elimination of the well created by overlay of a front bezel and a joint created by the overlap of the bezel and an underlying display surface.

Furthermore, the configuration described in detail below enables a device to present images that are enhanced by minimizing or eliminating materials and index of refraction boundaries between the display layer and the user. This minimizes or eliminates loss of transmitted light by these layers. For example, in the case of an electrophoretic display, which may rely on reflected light, this configuration minimizes the loss of light incident upon and reflected by the display layer. Minimizing this light loss improves image quality.

To further improve image quality, the surface display assembly may be constructed such that it is substantially free of dips, ripples, or other surface distortions that may detract from the presentation of the image. Assembly tolerances may be managed to reduce opportunities for assembly stack-ups to create mismatches between the viewable area of the display and surrounding contingent surfaces.

Devices having surface displays may be assembled using a variety of processes. In one implementation, a device may be assembled using a bottom-up, one-axis assembly method, which begins with a substrate (such as glass, metal, plastic, and so forth). The substrate may incorporate a metalized or other conductive layer to create an electrical circuit, and may also act as a backplane. An encapsulated sheet of display material (such as an electrophoretic display layer) may be applied to the backplane, followed by a protective sheet to form a stack. In one implementation, this stack including the protective sheet forms an electrophoretic display. The stack is then sealed to prevent moisture from penetrating between the layers, which can result in damage or malfunction of the device. In some implementations, sealing may provide protection against electrostatic discharge instead of, or in addition to, moisture protection.

In one implementation, additional components, such as display driver integrated circuits and flexible circuits, may be attached to the substrate. These components enable coupling between the display and a main logic board. The main logic board may incorporate components such as a processor, memory, peripherals, and so forth. To aid assembly of the display, the backplane may present a larger footprint than the other layers to allow ease of access during the application of other component parts.

Illustrative Touch-Screen Device

FIG. 1 depicts an illustrative electronic device implementing touch-screen functionality, such as an eBook reader device 100. While an eBook reader device 100 is illustrated, other electronic devices may be configured to form a touch-sensitive array from assembly of one or more integrated packages. These other devices include cellular phones, portable media players, tablet computers, netbooks, laptops, and so forth. Furthermore, while a touch sensor comprising a crosspoint array is shown, other technologies such a capacitive touch sensor may be used.

Furthermore, in some implementations integrated packages may be used to form other active components. For example, the first layer and second layers may, when combined, form a display device, memory device, photovoltaic array, light emitting diode array, and so forth.

FIG. 1 depicts that eBook reader device 100 includes a display 102, described in more depth below with regards to FIG. 2. Approximately perpendicular to the long axis of the display is cross sectional line "X." As illustrated, eBook reader device 100 includes an active component such as crosspoint array 104. In one implementation, the crosspoint array 104 is established upon coupling of a first integrated package 106 that includes a first layer 108 to a second integrated package 110 that includes a second layer 112. When formed into the crosspoint array 104, the wires within the first layer 108 are generally perpendicular to the wires within the second layer 112, although they may reside at any other angle relative to one another in other implementations. Coupling may include placement of the first integrated package 106 proximate to the second integrated package 110, such that the first layer 108 and second layer 112 are at least partially in contact with one another.

Figure 2:
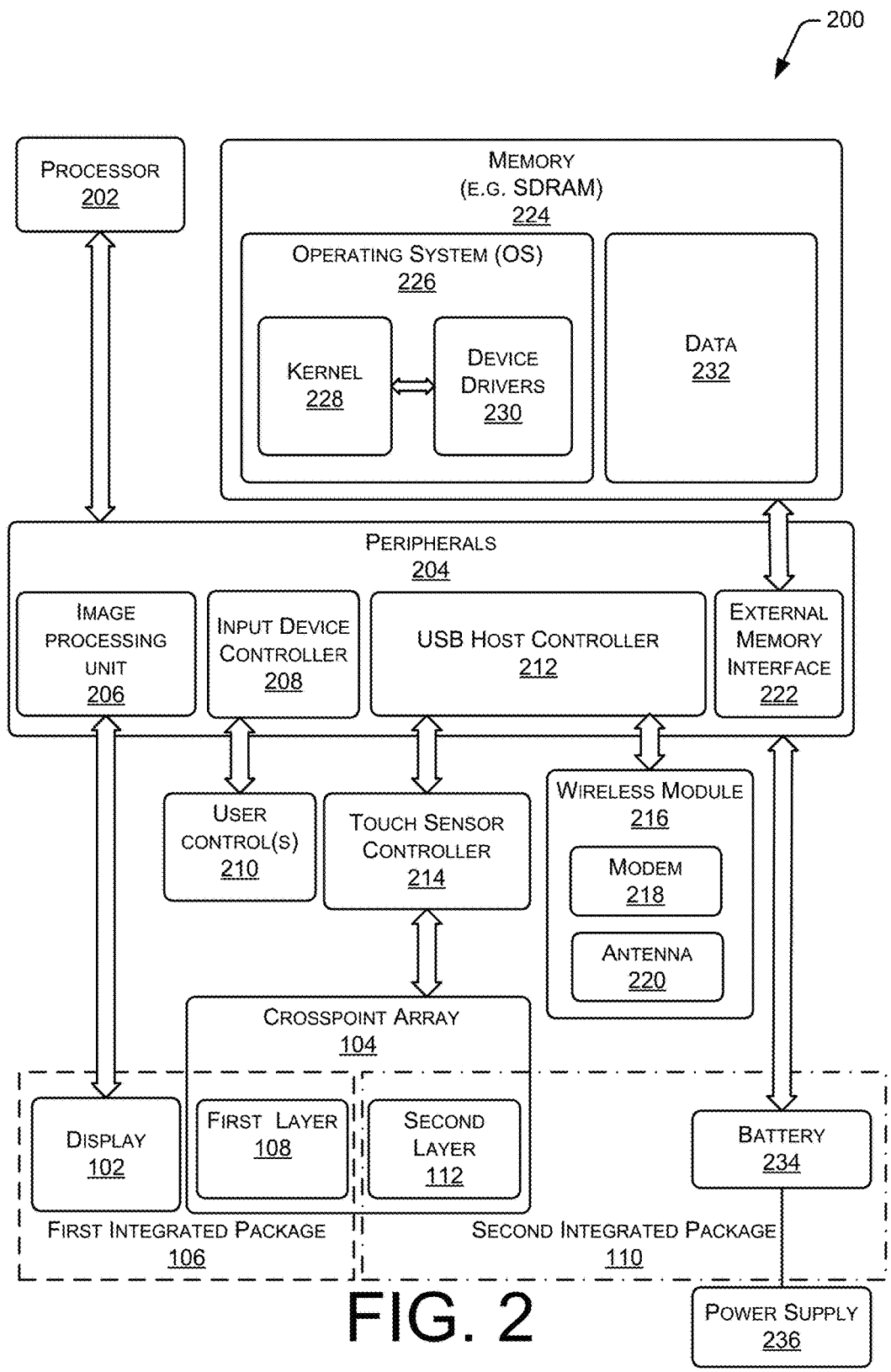
FIG. 2 is an illustrative schematic of an electronic device showing an example distribution of components across the integrated packages.

FIG. 2 is an illustrative schematic 200 of an electronic device, such as an eBook reader device 100, showing the crosspoint array 104 and distribution of layers across two integrated packages. In a very basic configuration, the device 100 includes components such as a processor 202 and one or more peripherals 204. Each processor 202 may itself comprise one or more processors.

Peripherals 204 couple to the processor 202. An image processing unit 206 is shown coupled to one or more display components 102 (or "displays"). In some implementations, multiple displays may be present and coupled to the image processing unit 206. These multiple displays may be located in the same or different enclosures or panels. Furthermore, one or more image processing units 206 may couple to the multiple displays.

Display 102 may present content in a human-readable format to a user. The display 102 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 102 may take the form of electronic books or "eBooks." For example, the display 102 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The device 100 further includes a touch sensitive input device. In one implementation, the crosspoint array 104 may be placed behind the display, such that user input through contact or gesturing relative to the display 102 may be received. In other implementations, the touch sensor may be placed in front of the display 102, or in another part of the device altogether. For convenience only, the display 102 is shown in a generally rectangular configuration. However, it is understood that the display 102 may be implemented in any shape, and may have any ratio of height to width. Also, for stylistic or design purposes, the display 102 may be curved or otherwise non-linearly shaped. Furthermore the display 102 may be flexible and configured to fold or roll.

EBook reader device 100 may have an input device controller 208 configured to accept input from the touch sensor, keypad, keyboard, or other user actuable controls 210. These user actuable controls 210 may have dedicated or assigned operations. For instance, the actuatable controls 112 may include page turning buttons, a joystick, navigational keys, a power on/off button, selection keys, joystick, touchpad, and so on.

A USB host controller 212 may also be located on the main logic board 202. The USB host controller 212 manages communications between devices attached to a universal serial bus ("USB") and the processor 202 and other peripherals.

FIG. 2 further illustrates that eBook reader device 100 includes a touch sensor controller 214. The touch sensor controller 214 may be coupled to the processor 202 via an interconnect to the USB host controller 212 (as shown). In other implementations the touch sensor controller 214 may couple to the processor via the input device control 208, inter-integrated circuit ("I²C"), universal asynchronous receiver/transmitter ("UART"), or serial peripheral interface bus ("SPI"), or other interface. The touch sensor controller 214 is also coupled to the first layer 108 and second layer 112. Interconnects include an electrical conductor, an optical path, electromagnetic waveguides, fluidic channels, magnetic couplings, mechanical couplings, wireless signal, and so forth. In some implementations, interconnects may be integral to components. Interconnects may be rigid, flexible, elastomeric, and so forth.

The touch sensor controller 214 is configured to use the crosspoint array 104 to determine characteristics of interaction with the touch sensor. These characteristics may include the location of the touch on the crosspoint array 104, magnitude of the force, shape of the touch, and so forth.

The USB host controller 212 may also be coupled to a wireless module 216 via the universal serial bus. Wireless module 216 may allow for connection to wireless local or wireless wide area networks ("WWAN"). Wireless module 216 may include a modem 218 configured to send and receive data wirelessly and one or more antennas 220 suitable for propagating a wireless signal. In other implementations, a wired network interface may be provided.

EBook reader device 100 may also include an external memory interface ("EMI") 222 coupled to external memory 224. The EMI 222 manages access to data stored in external memory 224. The external memory 224 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

External memory 224 may store an operating system 226 comprising a kernel 228 operatively coupled to one or more device drivers 230. Device drivers 230 are also operatively coupled to peripherals 204. External memory 224 may also store data 232, which may comprise content objects for consumption on eBook reader device 100, executable programs, databases, user settings, configuration files, device status, and so forth.

Furthermore, eBook reader device 100 may include one or more other, non-illustrated peripherals, such as a hard drive using magnetic, optical, or solid state storage to store information, a firewire bus, a Bluetooth™ wireless network interface, camera, global positioning system, PC Card component, and so forth.

One or more batteries 234 provide operational electrical power to components of the eBook reader device 100 for operation when the device is disconnected from a power supply 236. Operational electrical power is sufficient to provide for operation of the device, as distinguished from the lesser electrical power requirements of a sleep or state retention mode. Power supply 236 may be internal or external to the eBook reader device 100. Power supply 236 is configured to provide operational power for eBook reader device 100, charge battery 234, or both. "Battery" as used in this application includes components capable of acting as a power source to an electronic device. Power sources include chemical storage cells such as lithium polymer batteries, charge storage devices such as ultracapacitors, fuel cells, and so forth.

Couplings, such as that between input device controller 208 and user controls 210, are shown for emphasis. There are couplings between many of the components illustrated in FIG. 2, but graphical arrows are omitted for clarity of illustration.

Figure 3A:
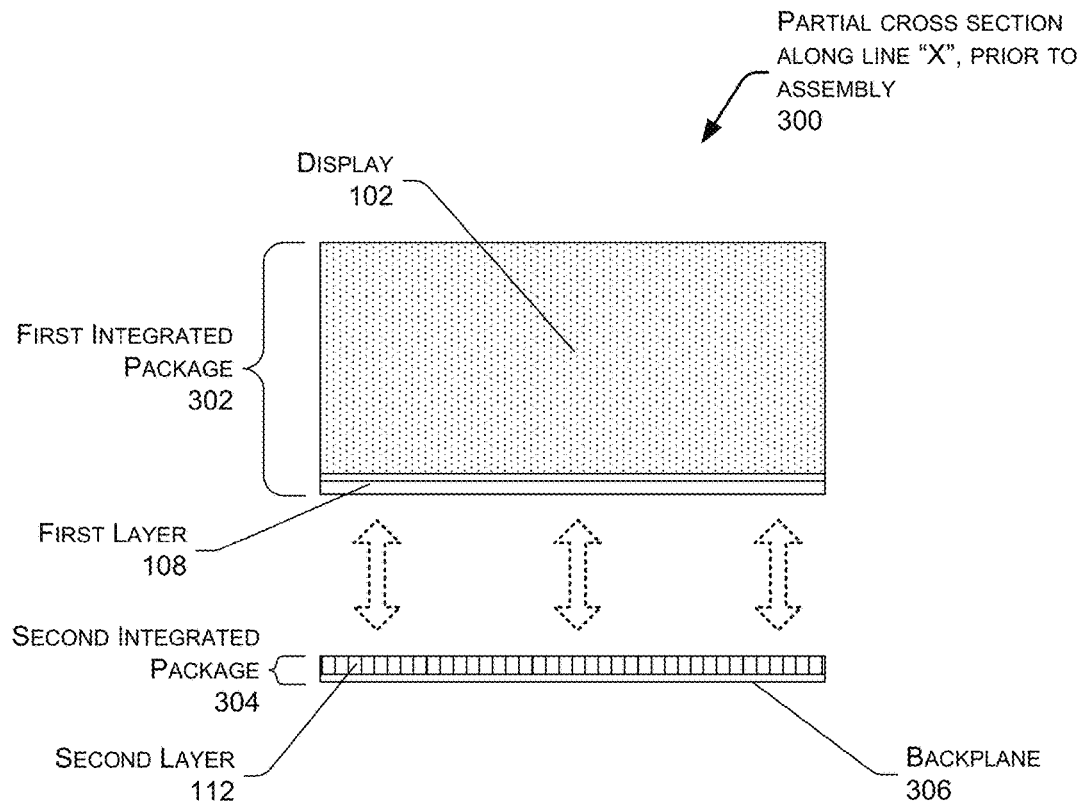
FIGS. 3A and 3B illustrate cross sections of a first implementation of a device having two integrated packages combined to form the crosspoint array.
Figure 3B:
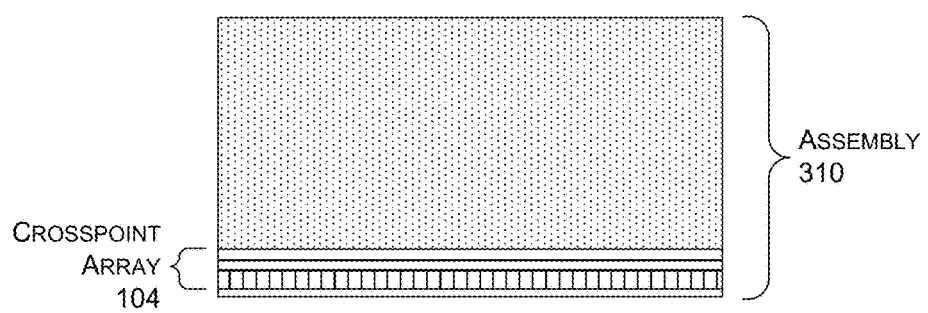

FIGS. 3A and 3B illustrate one implementation of the eBook reader device 100. In FIG. 3A, a cross section 300 of a portion of the device prior to assembly and along line "X" is shown. A first integrated package 302 includes the display 102 and the first layer 108. A second integrated package 304 includes the second layer 112 and a backplane 306. The backplane 306 may be a conductive surface providing a ground plane, a circuit board, and so forth.

As shown here, a layer for an active component such as a crosspoint layer may be deposited onto, etched into, integral with, or bonded to a host component. The host component provides a framework, matrix, or substrate for the layer. Thus, a host component provides functionality or structure to the device in addition to acting as a substrate for a layer of the active component. In some implementations, the host component itself may be active, in that it produces, consumes, or stores electrical power. The host component may also form a part of the shell, enclosure, or protective covering of the device. For example, a transparent protective cover over the display 102 may also serve as a host component for a layer.

By using the host component to provide at least a portion of the structure of the layer, complexity, thickness, and parts count during assembly are reduced. Thus, it is possible to omit portions of the structure which have previously been required. For example, in some implementations the layers may be printed, deposited, etched, or embedded directly onto or into host components, thus removing the need for a separate substrate during manufacture of each of the layers. Host components include a backplane 306, circuit board, display 102, battery 234, exterior case, component shell, interior structural partition, and so forth.

FIG. 3B illustrates an assembled cross section 308. Here, the first integrated package 302 has been combined with the second integrated package 304. The assembled placement of the first layer 108 proximate to the second layer 112 thus forms the crosspoint array 104. In the implementation depicted here, the first and second layers are present without a separate backing or substrate. Instead, the first 108 and second 112 layers have been deposited directly upon their host components, the display 102 and backplane 306, respectively.

As described above, when the first and second layers are proximate to one another, a pressure applied to the proximate layers will vary resistance to an electrical signal. This variance in resistance combined with a scan of the wires within the layers results in a machine-readable signal indicating magnitude and location of the applied force. Upon assembly 310, the layers form a crosspoint array 104, which in combination with the host component display 102, and upon coupling to the touch sensor controller 214, image processing unit 206, and other components, forms a touch-sensitive display. In contrast to traditional designs, substrates or backings on the layers have been omitted, thus resulting in a device having a relatively thinner profile or depth.

Figure 4A:
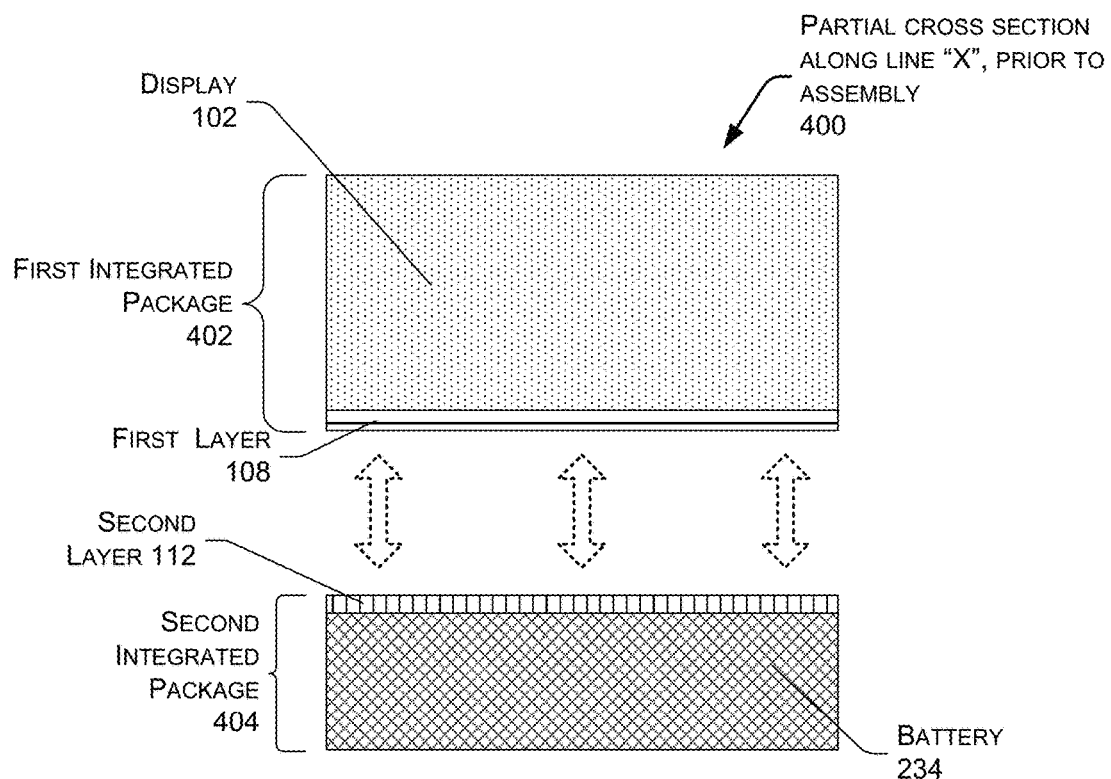
FIGS. 4A and 4B illustrate cross sections of a second implementation of a device having two integrated packages combined to form the crosspoint array.
Figure 4B:
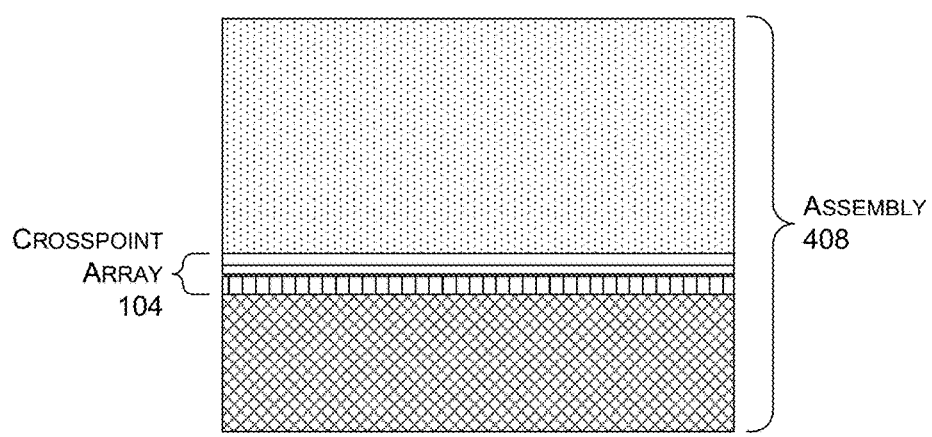

FIGS. 4A and 4B illustrate another implementation of the eBook reader device 100. FIG. 4A shows a cross section 400 of a portion of the device prior to assembly and along line "X". In this implementation, a first integrated package 402 comprises the display 102 and the first layer 108. A second integrated package 404 comprises the second layer 112 and the battery 234.

Host components in this figure include the display 102 and the battery 234. As described above, the first layer 108, the second layer 112, or both may be integral to a host component. For example, as shown here the first layer 108 is deposited onto a back surface of display 102.

In other implementations, one or more layers of the crosspoint array 104 may be bonded to the host component. This bonding may include mechanical fixation, adhesive, lamination, and so forth. For example, the second layer 112 having a carrier or substrate may be bonded to the battery 234 during fabrication. This may be fabrication of the battery 234, of a sub-assembly including the battery 234, or of the entire eBook reader device 100. Likewise, the first layer 108 may be bonded to the display 102 during fabrication of the screen.

By integrating or bonding layers of the crosspoint array 104 to host components, the overall manufacturing process may be simplified. For example, during final assembly of the device, or at least a sub-assembly containing the layers, formation of the crosspoint array 104 is accomplished by placing the first integrated package 402 atop the second integrated package 404. Without the techniques described herein, it would be necessary to insert one or more components such as two separate layers, each on a substrate, prior to assembly to form the crosspoint array 104.

Some crosspoint arrays may call for more than two layers. In such implementations, additional layers may be inserted between the first integrated package 402 and second integrated package 404.

In FIG. 4B, upon assembly 406 of the first integrated package 402 and the second integrated package 404, the crosspoint array 104 is formed. A resulting assembly 408 thus includes the crosspoint array 104, the display 102, and the battery 234.

In addition to simpler assembly, another advantage of these techniques is that a slimmer physical profile of the device may also be achieved. By using the host components as a substrate, backing material for the layers may be reduced or omitted. For example, where the crosspoint array 104 is a separate entity for installation, it may have a thicker substrate for handling the part during assembly. Use of a host component allows for the removal or reduction of this separate substrate. By removing or reducing the need for a separate substrate in the crosspoint array 104, the overall completed assembly 408 is thinner.

Multiple crosspoint arrays or other active components may be formed within the same eBook reader device 100. Furthermore, a component may act as a host component for several devices. For example, in addition to the crosspoint array 104 shown here, the battery 234 may also act as a host component for a first layer of a photovoltaic array deposited on the underside of the battery 234 while a portion of a device enclosure acts as a second layer of the photovoltaic array.

Figure 5A:
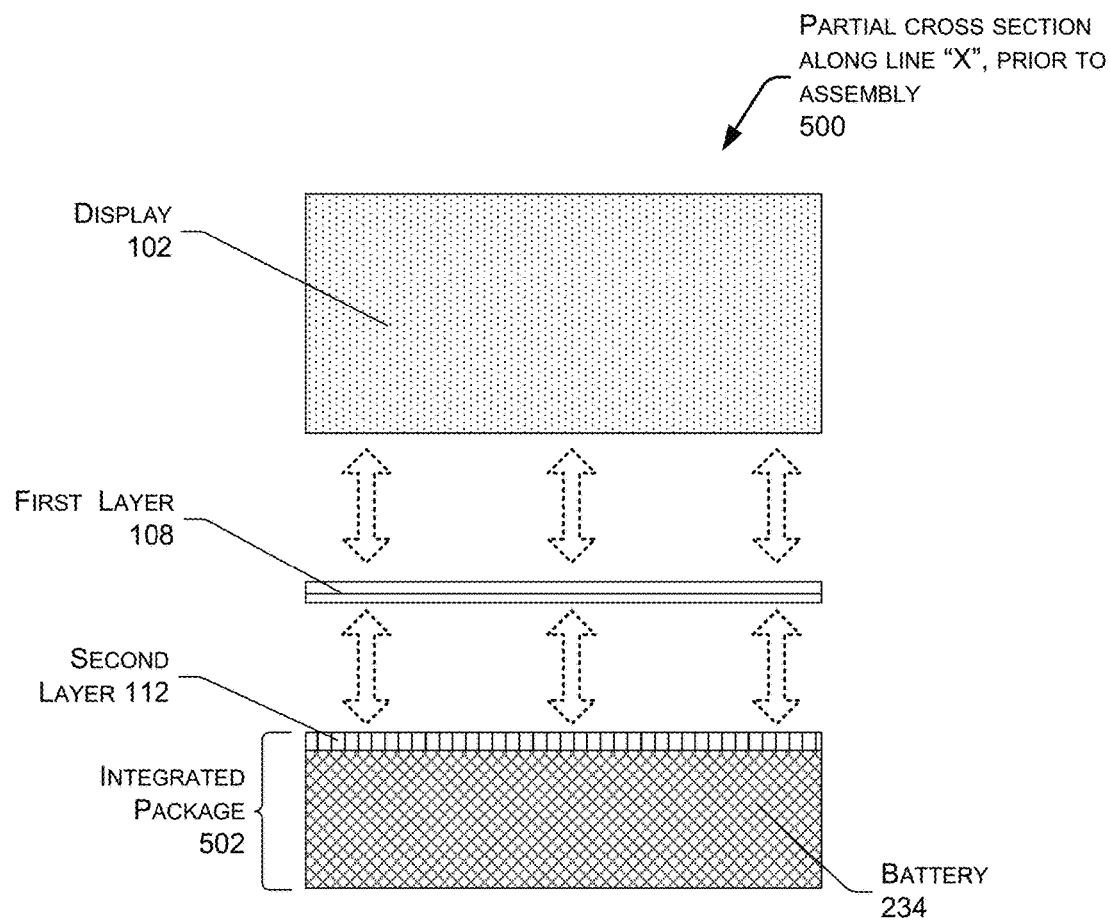
FIGS. 5A and 5B illustrate cross sections of a third implementation of a device comprising an integrated package combined to form the crosspoint array.
Figure 5B:
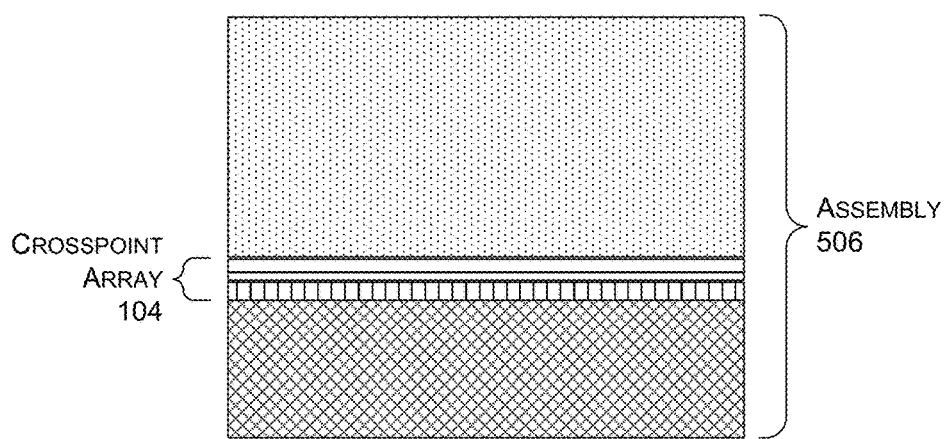

FIGS. 5A and 5B illustrate another implementation of an eBook reader device 100. FIG. 5A shows a cross section 500 of a portion of the device prior to the assembly along line "X". In this implementation, the display 102 is positioned above the first layer 108, which is in turn positioned above an integrated package 502. The integrated package 502 includes the second IFRS layer 112 and the battery 234.

In some implementations, it may be advantageous to refrain from involving the display 102 in additional manufacturing steps. For example, application of the first layer 108 to the display 102, as described above with respect to FIGS. 4A and 4B, may result in increased probability of unacceptable damage to the display 102, increasing yield fallout. Given that display components are typically costly relative to other components of the eBook reader device 100 or any other electronic device, a manufacturer may seek to avoid undue damage of the display components.

Therefore, in some situations, a single integrated package 502 may be used. As shown here, the integrated package 502 incorporates the (comparatively) less expensive battery 234 in conjunction with the second layer 112. During assembly only a single layer 108 is inserted.

When assembled as shown at 504, the first layer 108 and the second layer 112 thus form the crosspoint array 104. Thus, assembly 506 includes the crosspoint array 104, the display 102 and the battery 234.

Figure 6A:
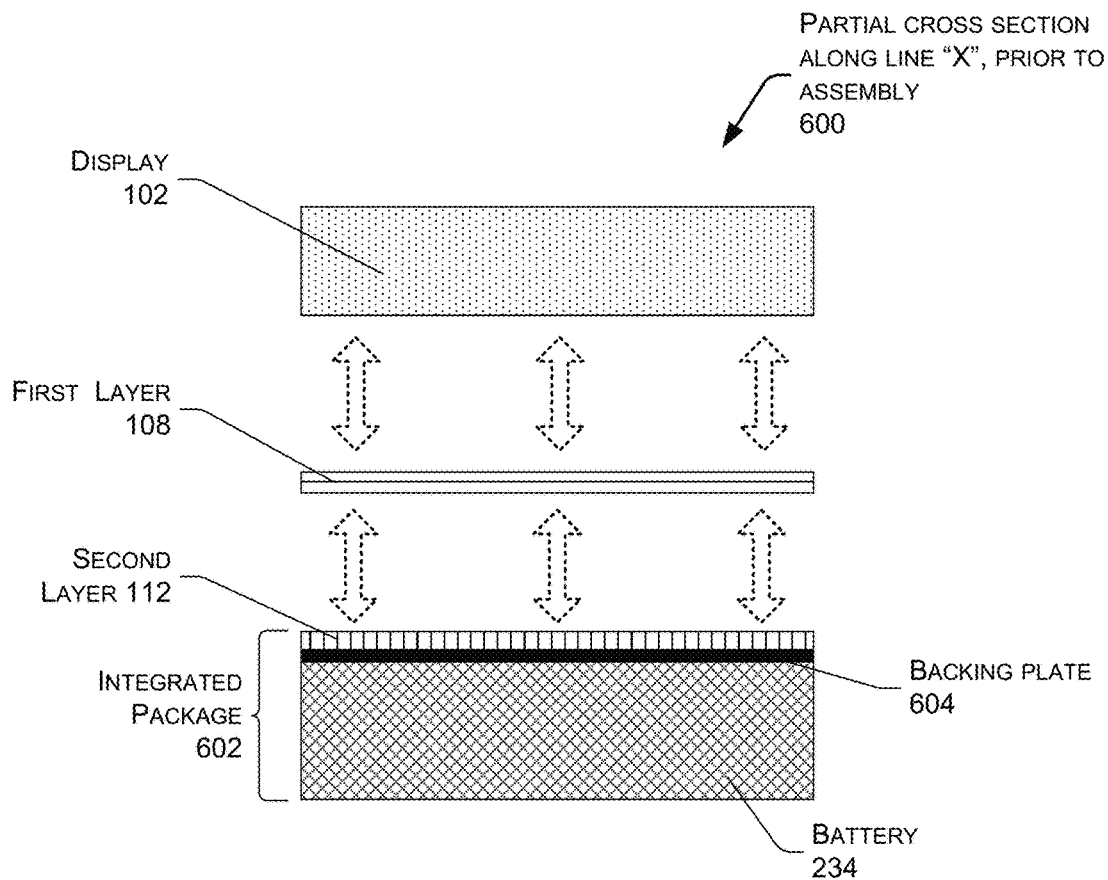
FIGS. 6A and 6B illustrate cross sections of another implementation of a device using a single integrated package to form the crosspoint array.
Figure 6B:
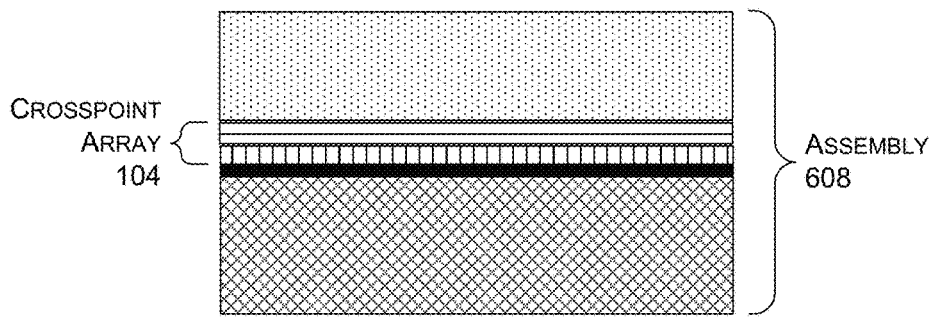

FIGS. 6A and 6B illustrate another implementation of an eBook reader device 100. FIG. 6A shows a cross section 600 of a portion of the device prior to assembly along line "X". In this implementation, the display 102, first layer 108, and an integrated package 602 are shown. As shown in this illustration, battery 234 acts as the host component to the second layer 112 in the integrated package 602. The integrated package 602 of this implementation includes the second layer 112, a backing plate 604, and the battery 234. Installation of the backing plate 604 reduces point pressure on the battery 234, smoothes out an otherwise irregular battery surface, and so forth.

Backing plate 604 may be constructed of a material which is rigid, semi-rigid, elastomeric, deformable, and so forth. Selection of material depends upon the desired result. For example, where it is desirable to distribute force across a larger area of a host component, a rigid or semi-rigid material may be used as the backing plate 604. In another example, where a relatively flat surface is desired, a deformable material may be used to even out variations in the surface of the host component. The backing plate may be relatively uniform in thickness, or may be contoured to match variations in thickness of the underlying host component.

In FIG. 6B, the assembled 606 components are shown. Here, assembly 608 includes the display 102, the crosspoint array 104 formed by the assembly, the backing plate 604, and the battery 234. When a force is applied to the crosspoint array 104, the backing plate 604 may distribute pressure across a larger area of battery 234.

While the crosspoint array 104 is shown above on the back side the display 102, in some implementations the crosspoint array 104 may be placed on the surface of the display 102. In such an implementation, the host component for the first layer 108 may be the exterior cover or surface over the display 102. The host component for the second layer 112 may then be the display 102, or more specifically, the surface of the display 102. In such an implementation, the wires of the crosspoint array 104 may be arranged approximately over inter-pixel dead spaces, to reduce interference with the image generated by display 102.

Figure 7A:
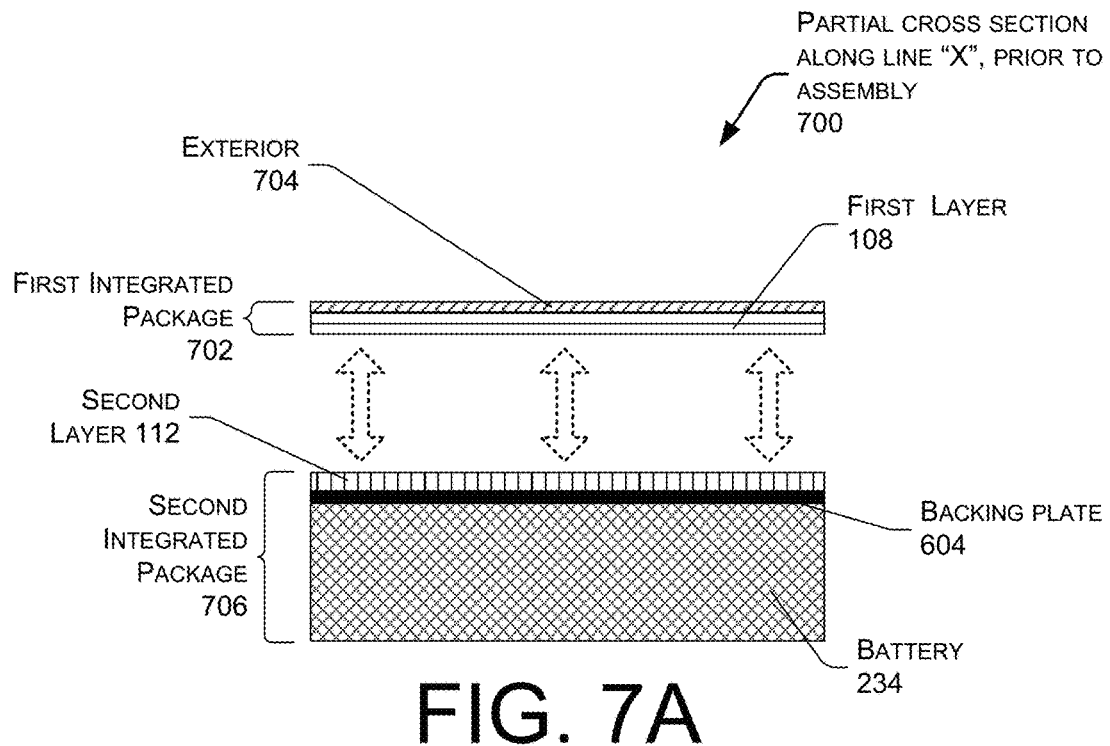
FIGS. 7A and 7B illustrate cross sections of an implementation of a device using two integrated packages to form the crosspoint array with a non-display surface.
Figure 7B:
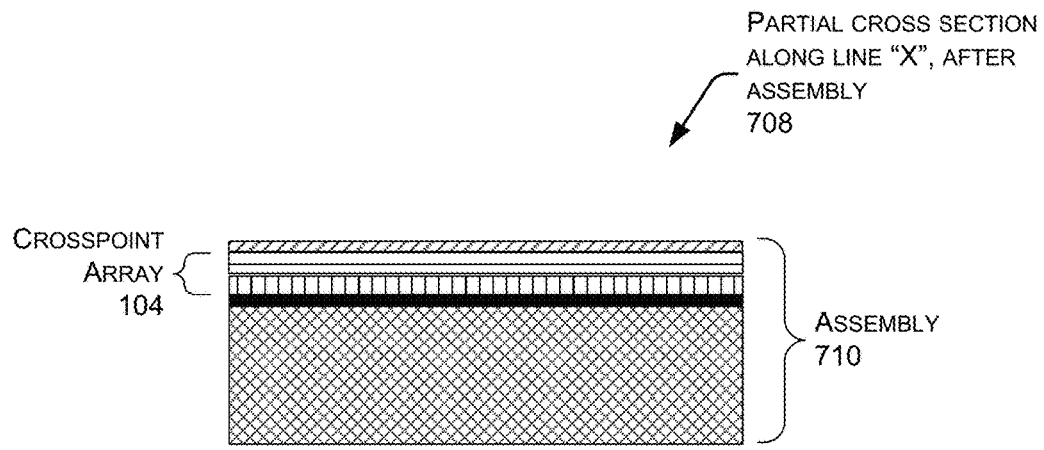

FIGS. 7A and 7B show an implementation of an eBook reader device 100, for a portion where no display is present. For example, the display may be located in a different portion of the eBook reader device 100, in another device, and so forth. FIG. 7A shows a cross section 700 of a portion of the device along line "X." In this illustration, a first integrated package 702 includes an exterior 704 and the first layer 108. Exterior 704 may be a pre-existing structure of one or more parts, or an encapsulating material, for example, a plastic or epoxy within which the first layer 108 is emplaced. A second integrated package 706 contains the second layer 112, the backing plate 604, and the battery 234.

In FIG. 7B, after assembly 708, the first integrated package 702 and the second integrated package 706 have been combined to form assembly 710. Assembly 710 thus includes the crosspoint array 104 formed as a result of the assembly.

Illustrative Process for Assembling a Reduced Height Device

Figure 8:
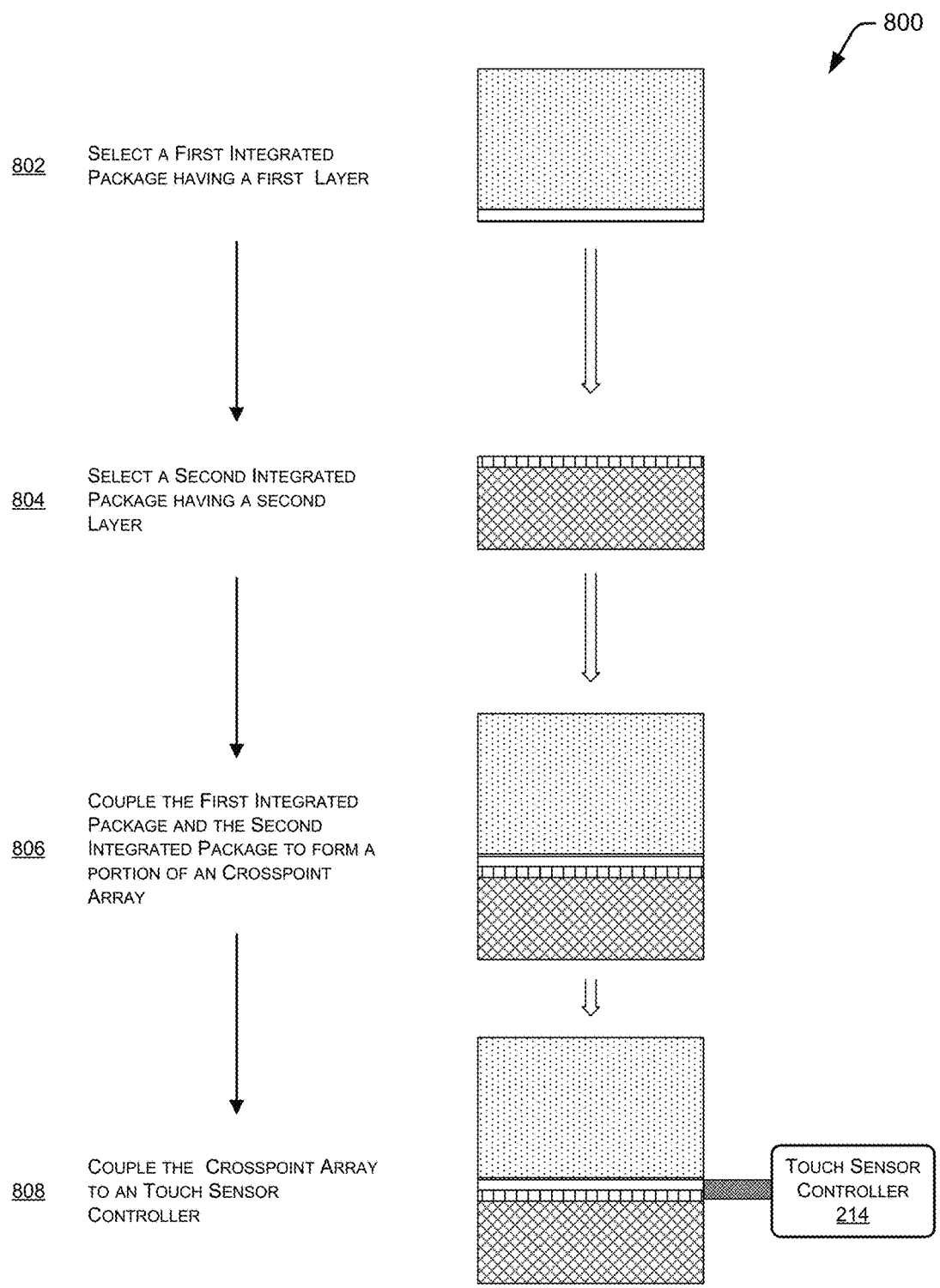
FIG. 8 is an illustrative process of assembling a crosspoint array from two integrated packages.

FIG. 8 illustrates an example process 800 that may be implemented by the architecture of FIGS. 1-7 or by other architectures. This process is illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 8 is an illustrative process 800 of assembling a touch sensor from an integrated package. Operation 802 selects a first integrated package having a first layer. For example, a display 102 may have a first layer 108 bonded to it. Packages may be selected manually, using a pick-and-place device or other automated equipment, or a combination of both.

Operation 804 selects a second integrated package having a second layer 112. Operation 806 couples the first integrated package and the second integrated package to form, at least in part, a crosspoint array 104. Coupling may be accomplished via soldering, mechanical insertion, physical contact, adhesion, and so forth. Operation 808 couples the crosspoint array 104 to a touch sensor controller 214 via an interconnect.

Surface Display Assembly

Bringing the display layer to the surface of a device provides several benefits. For instance, the prominence and presentation of images on the display improves due to minimized interference of intervening layers. In addition, the electronic device may be built with a slimmer profile and shadows created by bezels are reduced or eliminated. Additionally, a more robust spill/splash resistant assembly results from elimination of the well created by overlay of a front bezel and a joint created by the overlap of the bezel and an underlying display surface.

Figure 9:
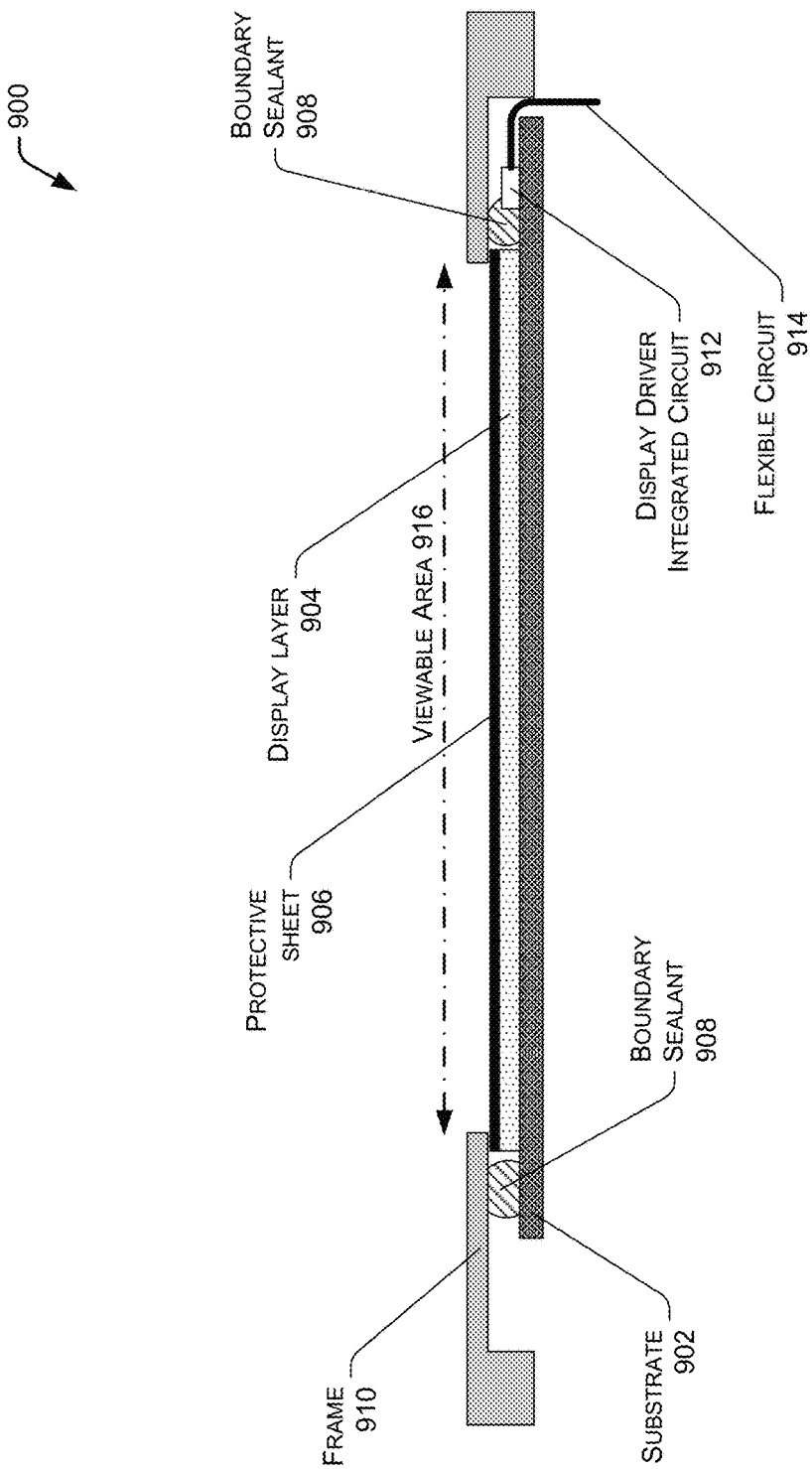
FIG. 9 illustrates a cross section of a traditional inset display assembly.

FIG. 9 illustrates a cross section 900 of an inset display assembly. Components of such a display may include a substrate 902 to which a display layer or sheet of encapsulated display material (such as an electrophoretic display) 904 is affixed. A protective sheet 906 placed atop the display layer provides a barrier to minimize scratching and other damage to the display layer 904. A boundary sealant 908 may be distributed around the display layer 904 to provide a seal between the substrate 902 and a frame 910. This boundary sealant 908 minimizes the intrusion of contaminants into the interior of the device.

A display driver integrated circuit 912 coupled to the display layer 904 is also shown. A flexible circuit board 914 couples the display driver integrated circuit 912 to a main logic board.

As shown, traditionally these components are assembled behind the frame 910 or bezel, building from the back of the device to the front. For example, a stack is assembled consisting of the substrate 902, the display layer 904, and the protective sheet 906. The boundary sealant 908 is applied to the front of the substrate complementary to the frame 910, and the frame 910 is placed atop the stack, coming into contact with the boundary sealant 908. As a result, the display layer 904 and protective sheet 906 are inset. This inset arrangement results in the numerous associated drawbacks described above, such as shadow lines from the bezel, collection points for spilled liquids, and so forth. A viewable area 916 indicated by a broken line shows that the display layer 904 is partially obscured by a portion of the frame 910 due to the inset assembly.

Figure 10:
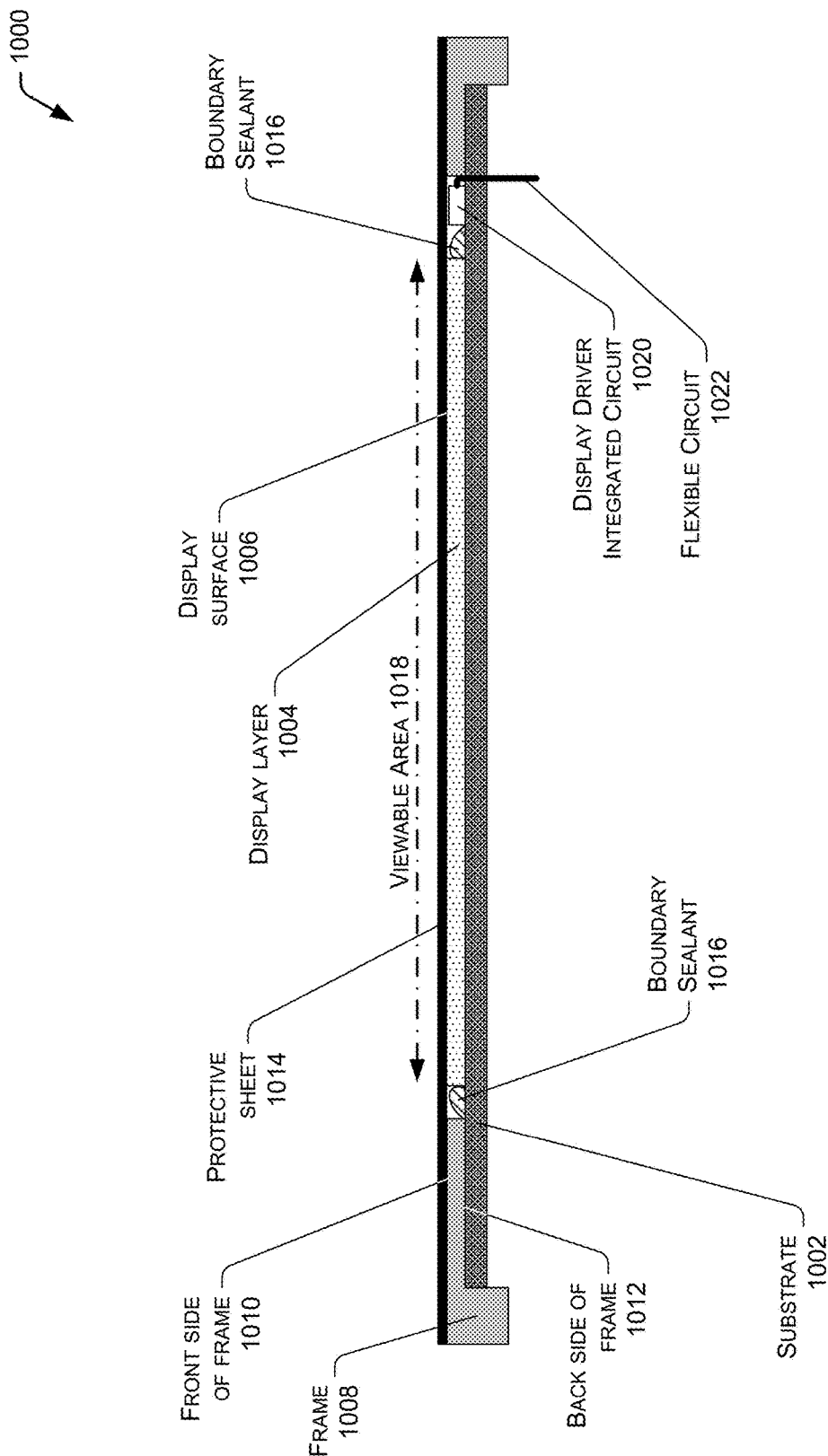
FIG. 10 illustrates a cross section of one implementation of a surface display assembly arranged such that a frame is between a backplane and a protective sheet which has been extended to form the front surface of the assembly.

In contrast, FIG. 10 illustrates a cross section 1000 of one implementation of a surface display assembly. The surface display assembly provides an unbroken surface to the user, while also minimizing the thickness of the device.

In this examples, a substrate 1002 binds or couples with a display layer 1004. The display layer 1004 comprises an active component configured to present an image to a user, such as an electrophoretic display. The substrate 1002 may provide mechanical or electrical support to the display layer 1004. The display layer 1004 forms a plane defined by a length and width of the display layer 1004. A display surface 1006 comprises a portion of the display that is proximate to the user during use. For example, the display surface 1006 may be considered the uppermost or front of the display.

A frame 1008 is disposed around at least a portion of the display layer 1004. In some implementations, the frame 1008 may comprise a plurality of pieces. For convenience, and not by way of limitation, the frame may be described as having a front side 1010 and a back side 1012. The front side 1010 of the frame 1008 is the portion of the frame 1008 which is proximate to the user during use. Conversely, the back side 1012 of the frame 1008 is that which is distal to the user during use. For example, the front side 1010 of the frame is side from which the user is intended to view images presented on the display layer 1004.

As shown in this illustration, the substrate 1002 is disposed such that a front side of the substrate is proximate to a back side 1012 of the frame 1008. In this configuration, the front side of the frame 1010 is thus generally flush with the display surface 1006. By sitting generally even with one another, the uppermost surfaces of the front side 1010 of the frame 1008 and the display surface 1006 define a plane. In some implementations, a mechanical joint or adhesive or both may join the frame 1008 with the substrate 1002.

A protective sheet 1014 is shown, proximate to the display surface 1006 and the front side 1010 of the frame 1008. This protective sheet 1014 extends over the display layer 1004 and the front side 1010 of the frame 1008. In some implementations, the protective sheet 1014 may extend around one or more edges of the frame 1008.

The protective sheet 1014 may comprise polyethylene terephthalate (PET), a glass, a plastic, or a combination of materials suitable to act as a barrier for protecting the display layer 1004 from unintended intrusion. At least a portion of the protective sheet 1014 that is complementary with the display layer 1004 is transparent. This transparent portion thus allows a user to view images presented upon the display layer 1004. In some implementations, the protective sheet may also incorporate active components, such as a crosspoint array 104 touch sensor.

In some instances, a display layer 1004 and associated components such as the protective sheet 1014 are not perfectly transmissive to light passing through. This is because light is lost due to absorption, scattering, and refraction that occurs at boundaries change due to mismatches in the refractive properties of materials and adhesives. With regards to displays, minimizing losses improves readability by making the display more legible, may reduce distortion to images presented thereupon, and generally improves the quality and performance of the display as perceived by users.

Furthermore, additional materials or thickness of existing materials may decrease transmission of light due to impurities or translucent effects due to molecular structures within the materials. In some implementations, to minimize or eliminate losses due to mismatches, additional material may be added in front of an existing protective sheet.

The additional material may be selected from optical, medical or food grade index matched plastics or glass. The additional layer may then be bonded through index matched adhesives, optical adhesives, and so forth. Such additional layers may thus enhance optical performance. Additional materials may also include anti-reflective, anti-glare, or other coatings to provide specific optical qualities.

The protective sheet 1014 may be bonded to the display layer 1004 using an optically compatible adhesive, such as one which is index of refraction matched. Use of the optically compatible adhesive may minimize changes in the index of refraction between the protective sheet 1014 and the display layer 1004, thus improving transmission of light through the protective sheet 1014.

The configuration of the front side 1010 of the frame 1008 being flush with the display surface 1006 also produces another advantage. Specifically, tolerances in production, placement, and so forth between the frame 1008 and display layer 1004 surfaces that would control the planarity of the protective sheet 1014 are minimized. Thus, the planarity of the protective sheet 1014 depends on controlling the thickness tolerances of the frame 1008 and the display layer 1004. This simplifies production considerations and reduces costs.

In some implementations, gaps may occur between components such as the frame 1008 and the display layer 1004. When the protective sheet 1014 is emplaced, spaces or voids may form between the protective sheet 1014 and underlying components. These voids may be filled to add mechanical support to the overlying protective sheet 1014, improve the appearance of the surface of the protective sheet 1014, and so forth.

Filler, such as boundary sealant 1016, may be used to fill, at least in part, spaces between the protective sheet 1014 and underlying components, such as the substrate 1002, the display driver integrated circuit 1020, and so forth. For example, a room-temperature vulcanizing silicone compound may fill voids between the protective sheet 1014 and the frame 1008, substrate 1002, and so forth. In other implementations, other fillers may be used. The fillers may be solid pieces designed for insertion, or compounds may be dispensed and achieve a substantially solid form.

Placement of the protective sheet 1014 over the display layer 1004 and the corresponding flush portions of the front side 1010 of the frame 1008 results in several advantages. First, an unbroken surface is presented to the user. This unbroken surface does not provide cracks or gaps through which contaminants may reach the interior of a device. This significantly reduces the potential for damage due to infiltration of liquid, dirt, and so forth. Second, the unbroken surface also removes the problems associated with traditional bezels, such as shadow lines and potential encroachment on the display layer 1004. Third, placement of the protective sheet 1014 directly atop the display layer 1004 and without air gaps or other materials reduces transmission losses and distortion, improving image quality. Fourth, the overall height of the device is reduced, resulting in a slimmer profile.

A viewable area 1018 extends to the edges of the display layer 1004. Thus, the entire display area is presented to the user because the frame 1008 does not overlap the display layer 1004.

As illustrated, the display layer 1004 couples to a display driver integrated circuit 1020, which is configured to drive the display layer 1004 to produce an image. A flexible circuit 1022 provides an interconnect between the display driver integrated circuit 1020 and other components such as a main logic board. The main logic board may include the processor 202, the memory 224, peripherals, and other components as described above with respect to FIG. 2.

Figure 11:
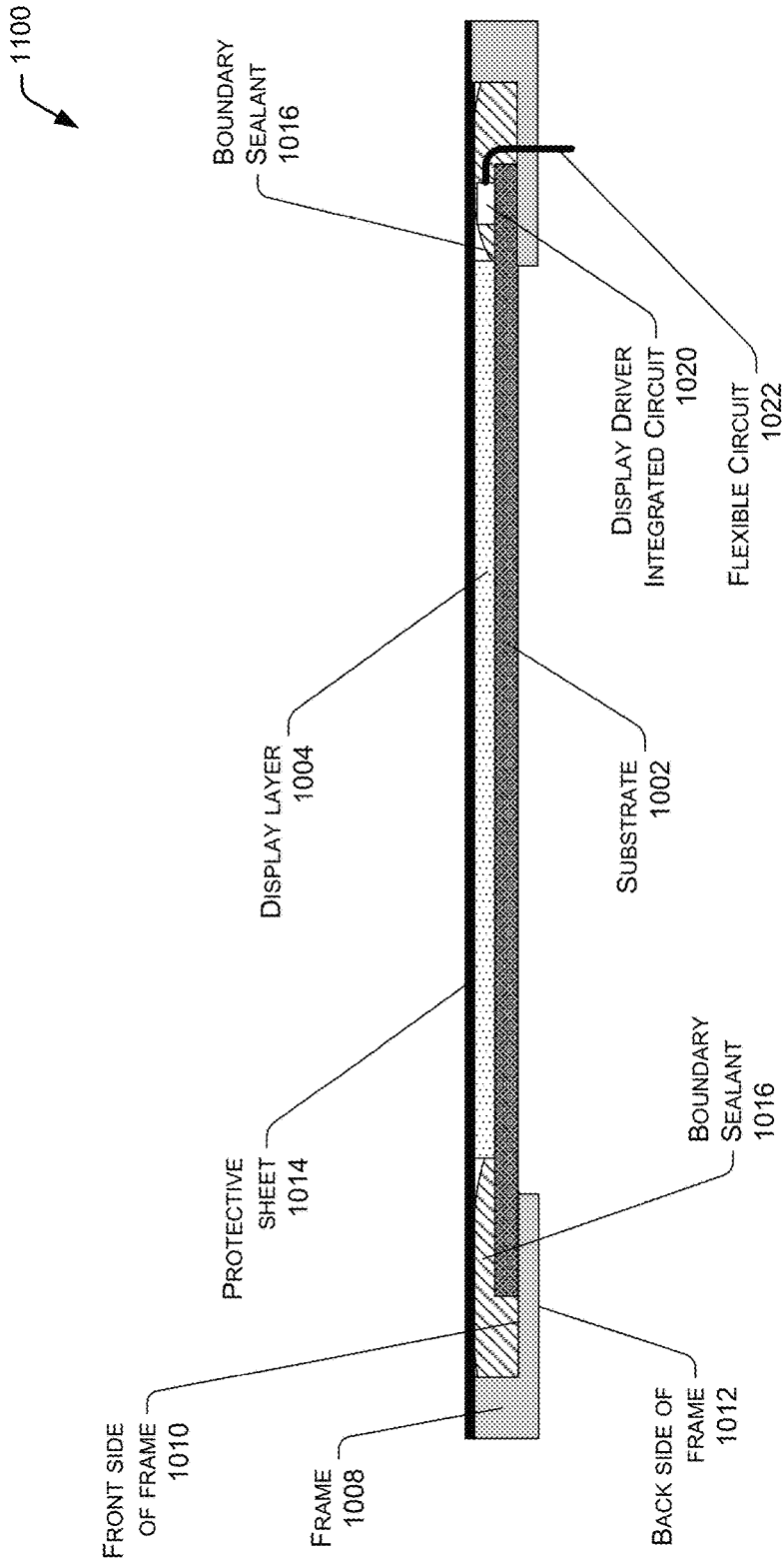
FIG. 11 illustrates a cross section of another implementation of a surface display assembly having a frame support and backplane.

FIG. 11 illustrates a cross section 1100 of another implementation of a surface display assembly. In this implementation, a back side of the substrate 1002 is placed proximate to a front side 1010 of the frame 1008. Thus, the substrate is in front of at least a portion of the frame 1008.

The protective sheet 1014 extends across the display layer 1004 and across the front side 1010 of the frame 1008. This configuration requires few, if any, changes to manufacturing process steps utilized today in the placement of display driver integrated circuits 1020, flexible circuits 1022, and boundary sealants 1016. This allows the production of surface display assemblies described in this implementation with existing production facilities.

In some implementations the extension of the protective sheet 1014 beyond the boundaries of the substrate 1002 may involve a modified manufacturing process. When a footprint of the substrate 1002 is more closely matched to a footprint of the display layer 1104, the assembly stack may be inverted. Such an inverted assembly process allows for bottom-up access and facilitates application of sealants and components such as the main logic board, battery, and so forth.

The frame 1008 may be integrated with the display layer 1004 during manufacture of the display layer 1004 in order to provide a desired degree of planarity. Thus a manufacturer may deliver the frame 1008 and display layer 1004 as an integrated sub-assembly. Furthermore, in some implementations the frame 1008 may also act as a substrate 1002 to the display layer 1004. For example, the display layer 1004 may be bonded to the frame 1008, eliminating the need for backplane. Or, in another implementation the substrate 1002 may be extended to also act as the frame 1008.

Figure 12:
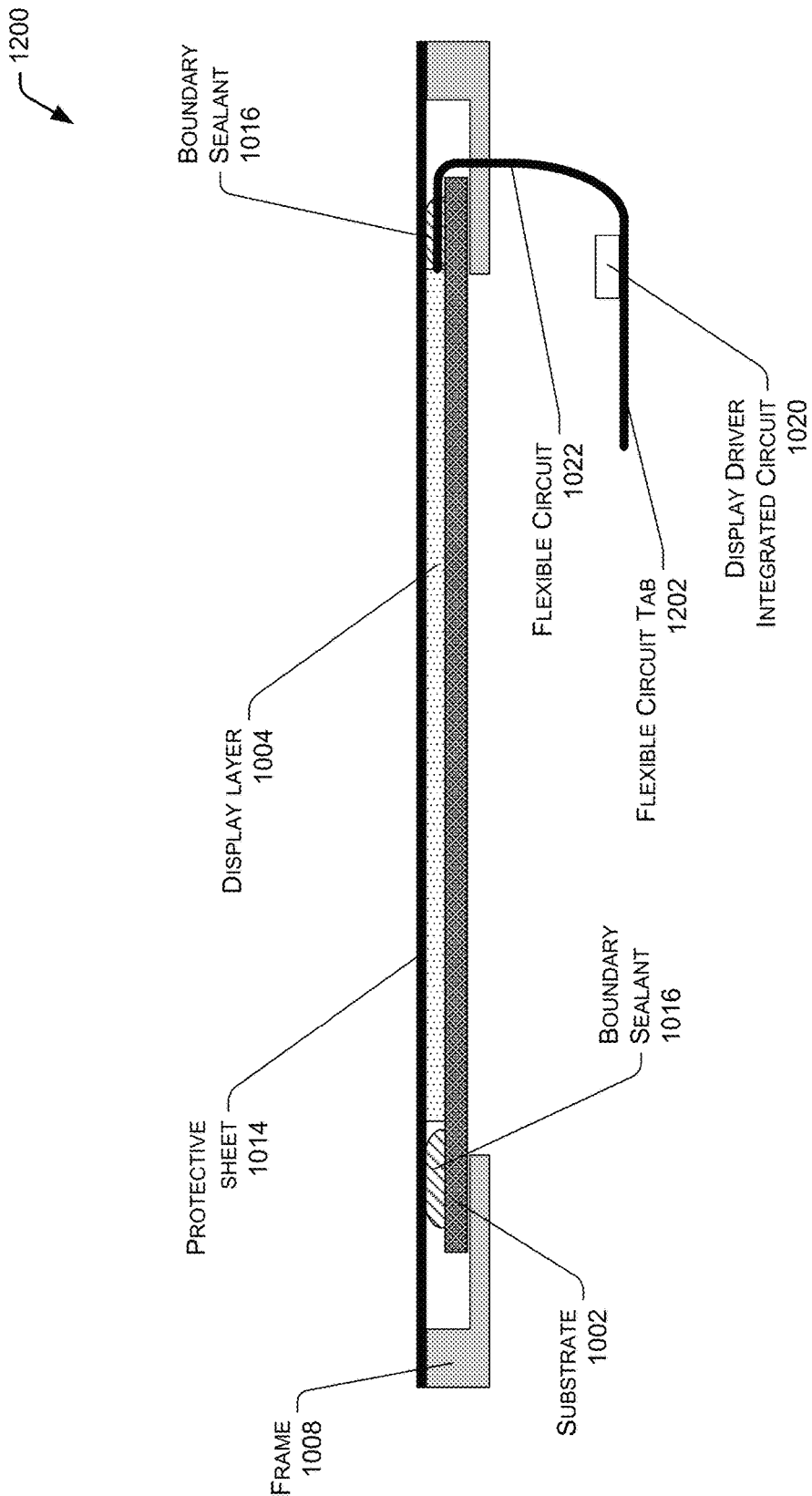
FIG. 12 illustrates a cross section of another implementation of a surface display assembly having a display driver integrated circuit arranged on a tab.

FIG. 12 illustrates a cross section 1200 of another implementation of a surface display assembly. As shown in this implementation, the flexible circuit 1022 couples the display layer 1004 to the display driver integrated circuit 1020 located on a flexible printed circuit board (or "tab") 1202. This flexible printed circuit board 1202 may also be the main logic board in some implementations. A benefit of this arrangement is that the footprint of the display driver integrated circuit 1020 is behind or adjacent to the display layer 1004 and the substrate 1002, allowing variation in placement to suit a desired form factor or physical configuration of the electronic device.

Figure 13:
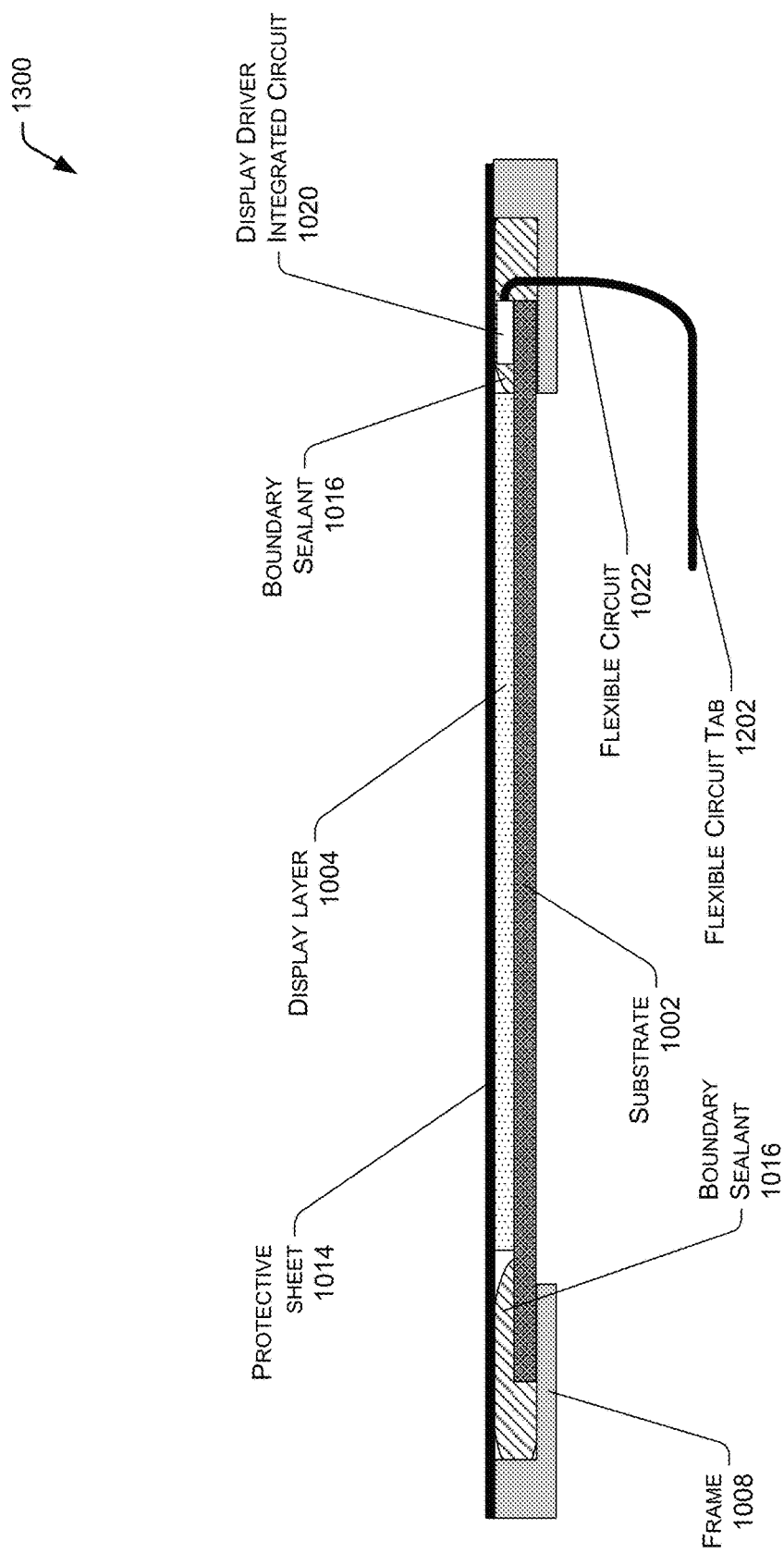
FIG. 13 illustrates a cross section of another implementation of a surface display assembly having a display driver integrated circuit arranged approximately coplanar with a display component.

FIG. 13 illustrates a cross section 1300 of another implementation of a surface display assembly. In this implementation, the display driver integrated circuit 1020 is arranged approximately coplanar with a display layer 1004. As shown here, the display driver integrated circuit 1020 has been affixed with adhesive or other bonding material to the substrate 1002 upon which the display layer 1004 is affixed or mounted. Placement of the display driver integrated circuit 1020 in this arrangement may reduce the profile of the device. Additionally, placement of the display driver integrated circuit 1020 proximate to the display layer 1004 may simplify routing and construction of an interconnection between the display driver integrated circuit and the display layer 1004.

Figure 14:
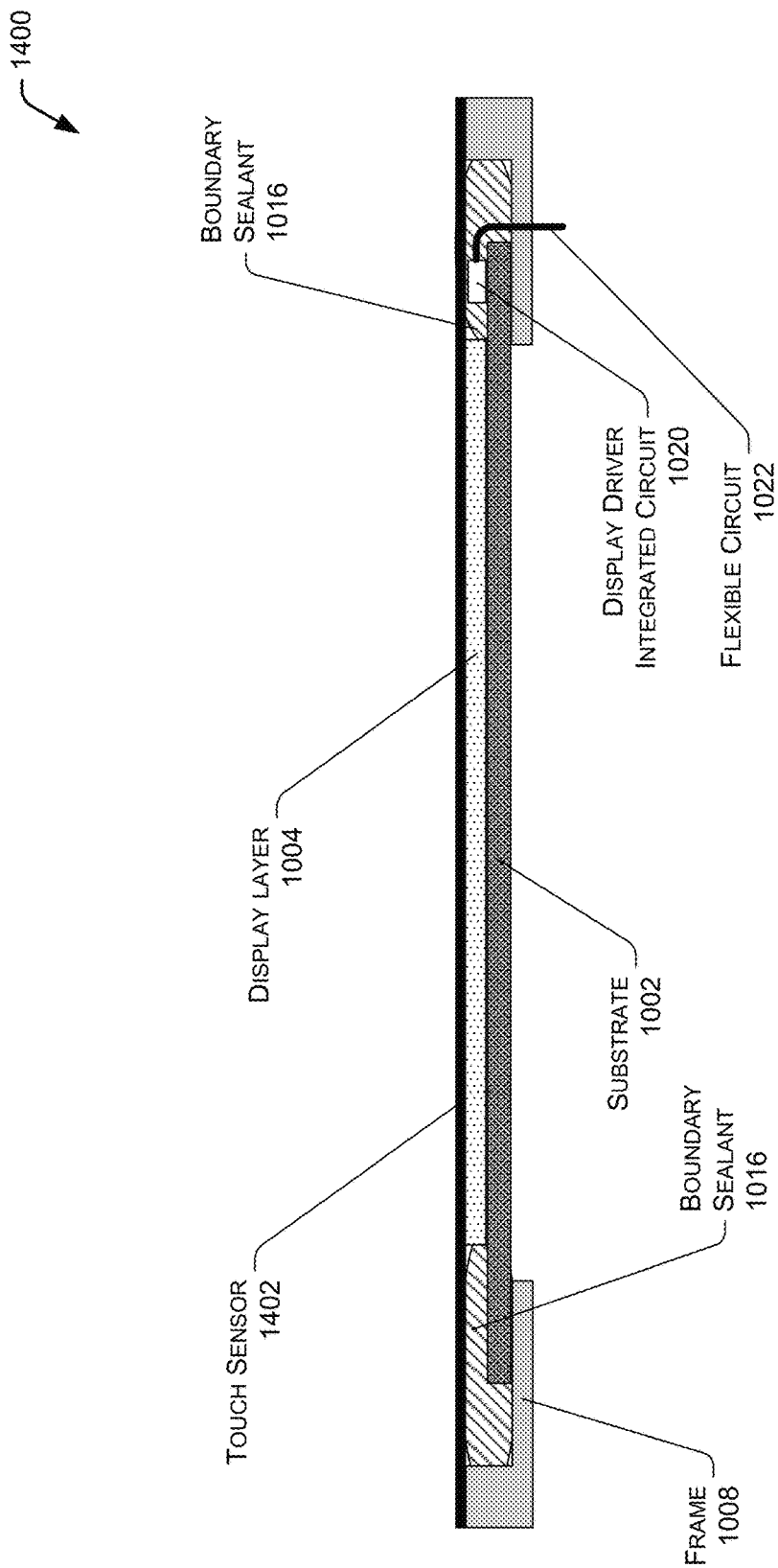
FIG. 14 illustrates a cross section of another implementation of a surface display assembly with a touch sensor.

FIG. 14 illustrates a cross section 1400 of another implementation of a surface display assembly. In this implementation, a touch sensor 1402 acts as the protective sheet. The touch sensor may comprise a crosspoint array 104, as described above. Thus, a touchscreen is formed while reducing overall thickness of the device. The active components of the crosspoint array 104 which comprise the touch sensor 1402 may cover only a portion of the surface area, or extend to the entire surface area. For example, in one implementation the crosspoint array 104 may provide for touch sensing only on areas complementary with the display layer 1004, but not for areas complementary to the frame 1008.

In some implementations, the protective sheet 1014 and the display surface 1006 may act as host components for the crosspoint array 104. For example, a first layer 108 may be deposited upon the back of the protective sheet 1014 while a second layer 112 is deposited upon the front of the display surface 1006. Upon placement of the protective sheet 1014 in proximity with the display surface 1006, the crosspoint array 104 is formed.

Figure 15:
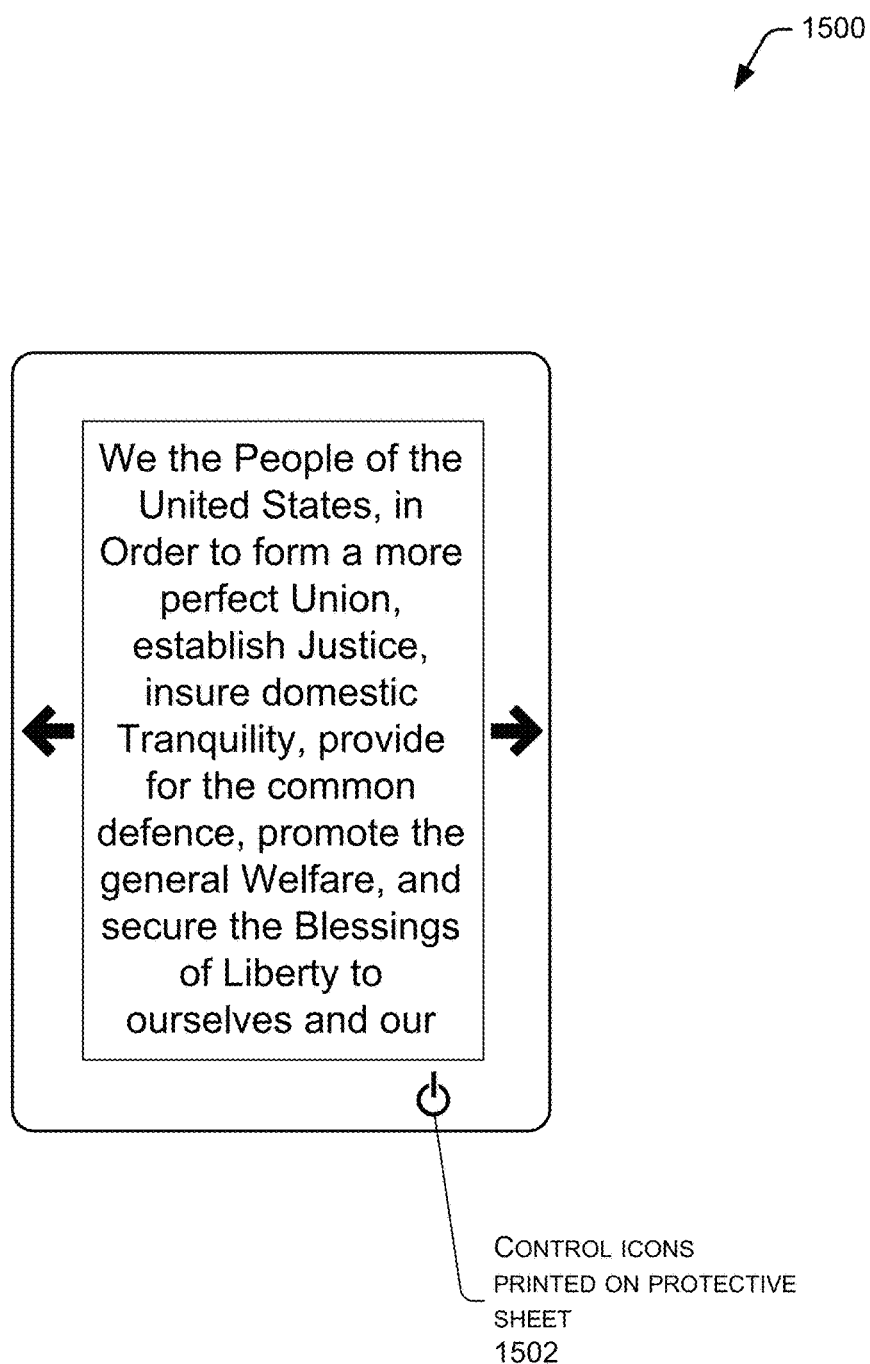
FIG. 15 illustrates a frontal view of a surface display assembly with control icons printed upon the protective sheet.

FIG. 15 illustrates a frontal view 1500 of a surface display assembly with control icons printed or otherwise visible upon the protective sheet 1014. The material comprising the protective sheet 1014 may be selected to be suitable for printing or image transfer. Icons 1502 denoting functions may be printed upon the protective sheet 1014, providing indicia to the user as to the function. For example, icons indicating a power switch, next page, and previous page may be displayed on the protective sheet 1014. The icons 1502 may be printed such that, when the surface display is assembled, the icon is disposed to correspond to an input device such as a switch, touch sensor element, and so forth. Thus, the user touching the icon activates the switch, which may in turn be configured to call a function for execution on the processor 202. In some implementations, such as where a projected capacitive sensor is used, the user may only need to approach the icon and underlying switch, without actually touching it, to activate the switch.

Figure 16:
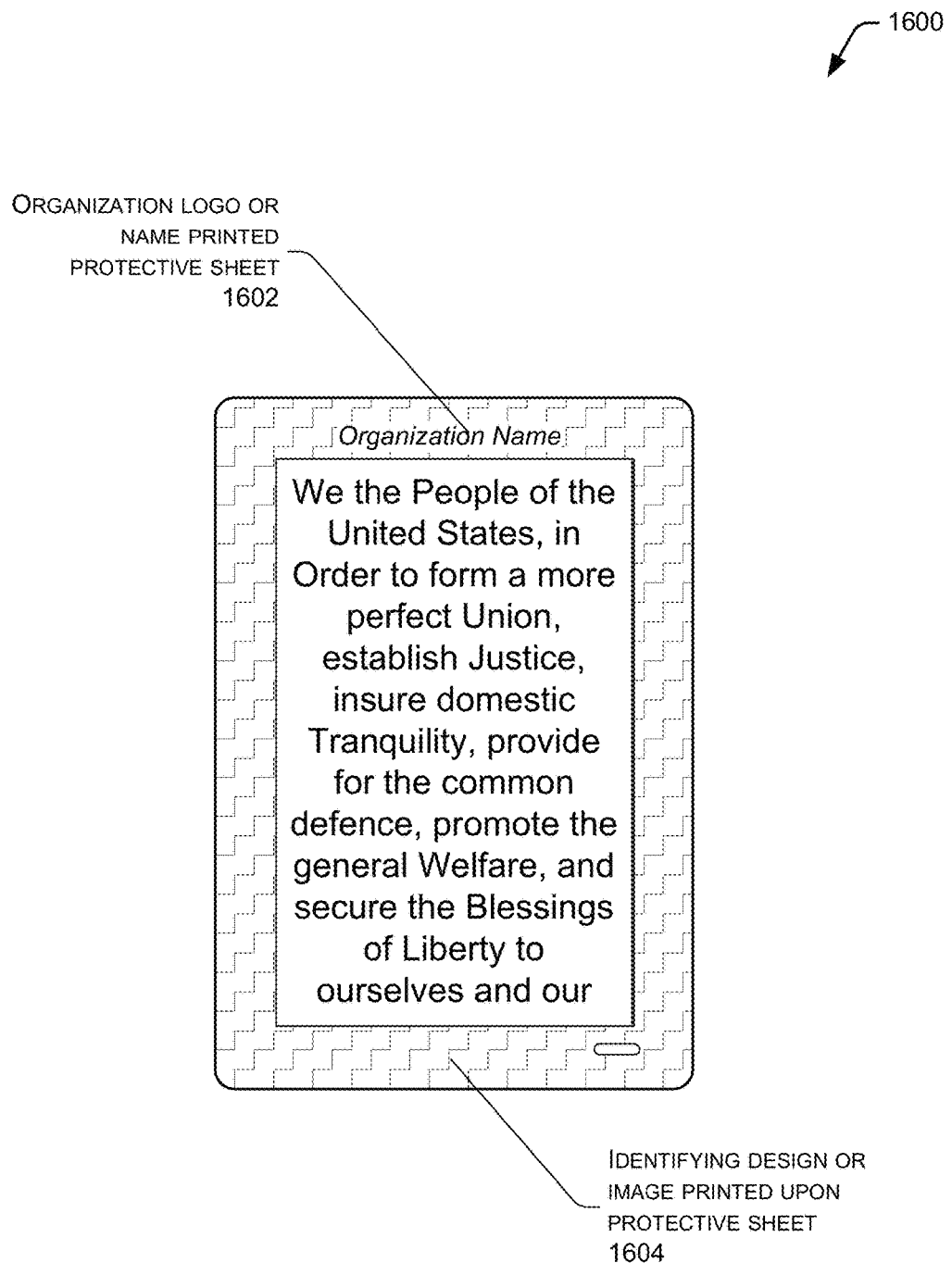
FIG. 16 illustrates a frontal view of a surface display assembly with markings printed upon the protective sheet.

FIG. 16 illustrates a frontal view 1600 of a surface display assembly with markings printed upon the protective sheet 1014. The markings may include an organization's logo or name 1602, name of an owner of the device, and so forth. For example, a retailer may place their name on eBook reader devices which they sell. In some implementations, a mask may be printed to conceal or obscure circuitry or internal components, while leaving an active display area transparent. This mask may be a solid color, design, picture, and so forth.

Identification markings 1604 may be printed on the protective sheet 1014. These markings may provide a quick and simple way for users to distinguish one device from several. In some implementations, these markings may also be ornamental, such as graphic design or picture. These markings, icons, images, and so forth may be placed onto the protective sheet in a variety of ways. For example, they may be printed, embedded, embossed, etched, generated due to a photochemical effect, or otherwise rendered such that they are visible.

Figure 17:
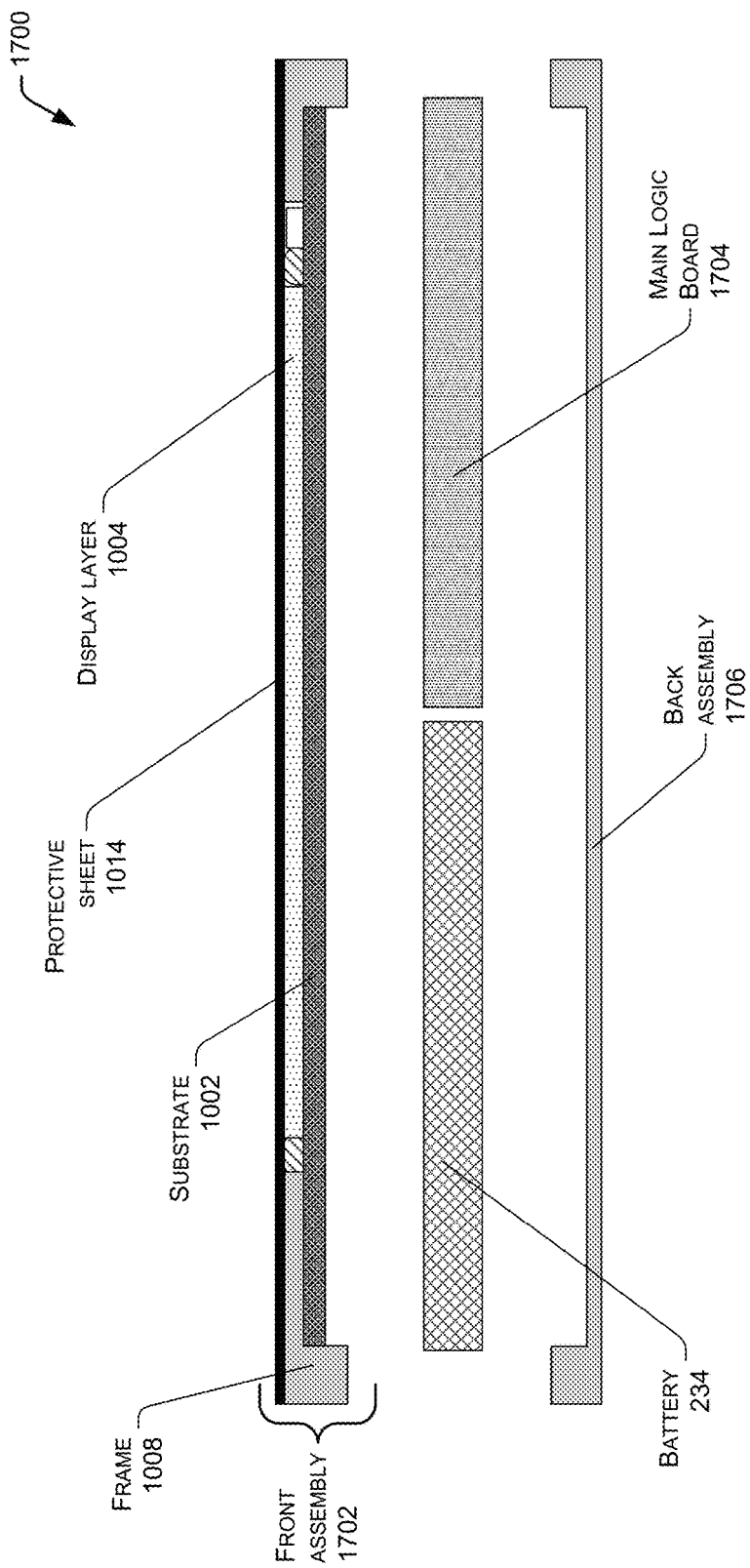
FIG. 17 illustrates an expanded cross section of an eBook reader device including a surface display assembly and other selected internal components.

FIG. 17 illustrates an expanded cross section 1700 of an eBook reader device including a surface display assembly and other selected internal components. As shown in this cross section, a front assembly 1702 comprises the frame 1008, the substrate 1002, the display layer 1004, and the protective sheet 1014.

Also shown are the battery 234 and a main logic board 1704. As described above, the main logic board 1704 may include the processor 202, the memory 224, and one or more peripherals 204. A back assembly 1706 is configured to complement the front assembly 1702 and encapsulate the battery 234, main logic board 1704, and other internal components.

Figure 18:
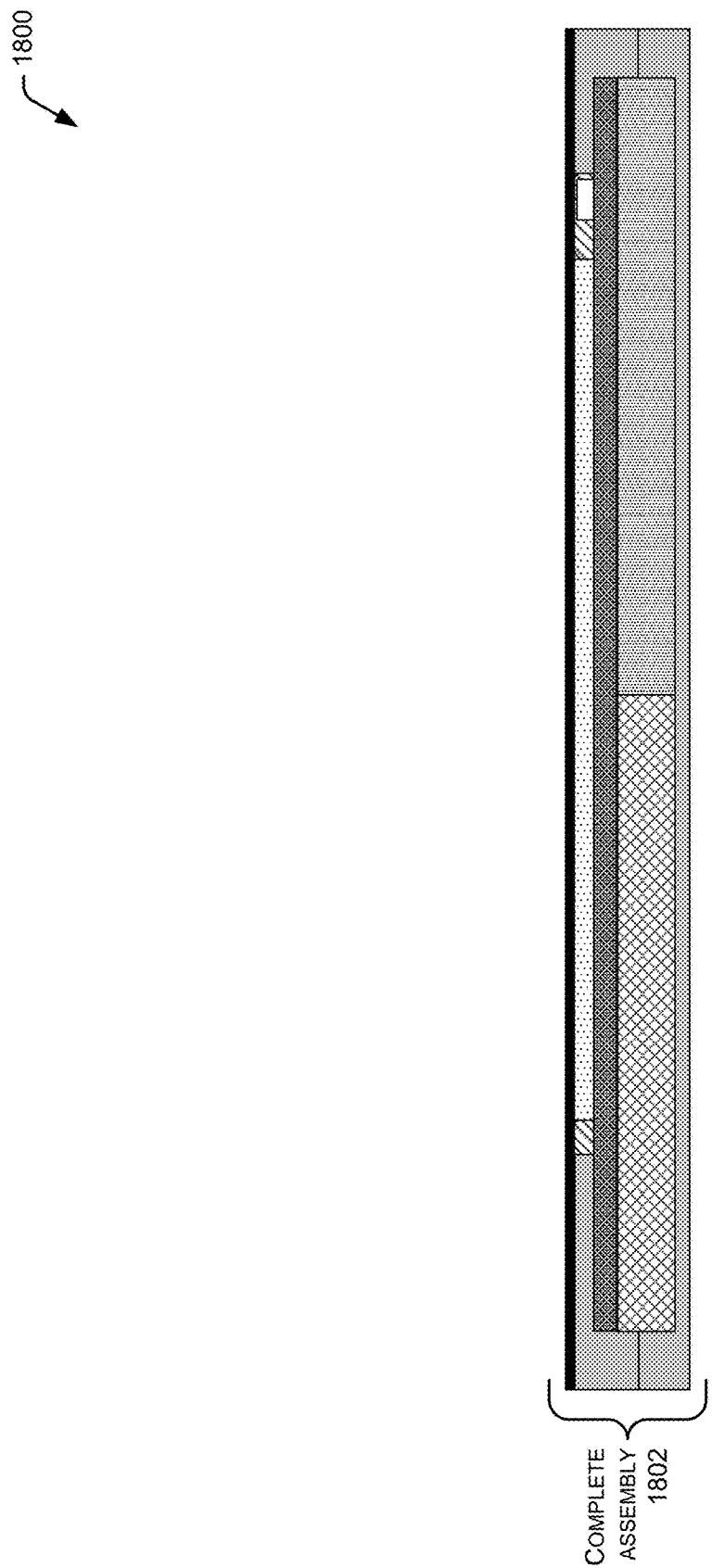
FIG. 18 illustrates a cross section of the eBook reader device of FIG. 17 when the components have been assembled.

FIG. 18 illustrates a cross section 1800 of the eBook reader device of FIG. 17 when the components have been assembled. A complete assembly 1802 is shown, with the front assembly 1702 and the back assembly 1706 having been joined at a common interface. Mechanical fasteners, adhesives, and so forth may join the front assembly 1702 and the back assembly 1706. In some implementations the front assembly 1702 and the back assembly 1706 may be joined directly. In other implementations each may join to an intermediate component such as an internal frame, battery 234, main logic board 1704, and so forth.

This illustration clearly shows the slim profile and clean exterior lines of a device incorporating the surface display. Extending the protective sheet 1014 creates a smooth, unbroken surface. This results in a clean appearance while improving display quality, minimizing the opportunity for contaminants to infiltrate the device, and so forth.

Figure 19:
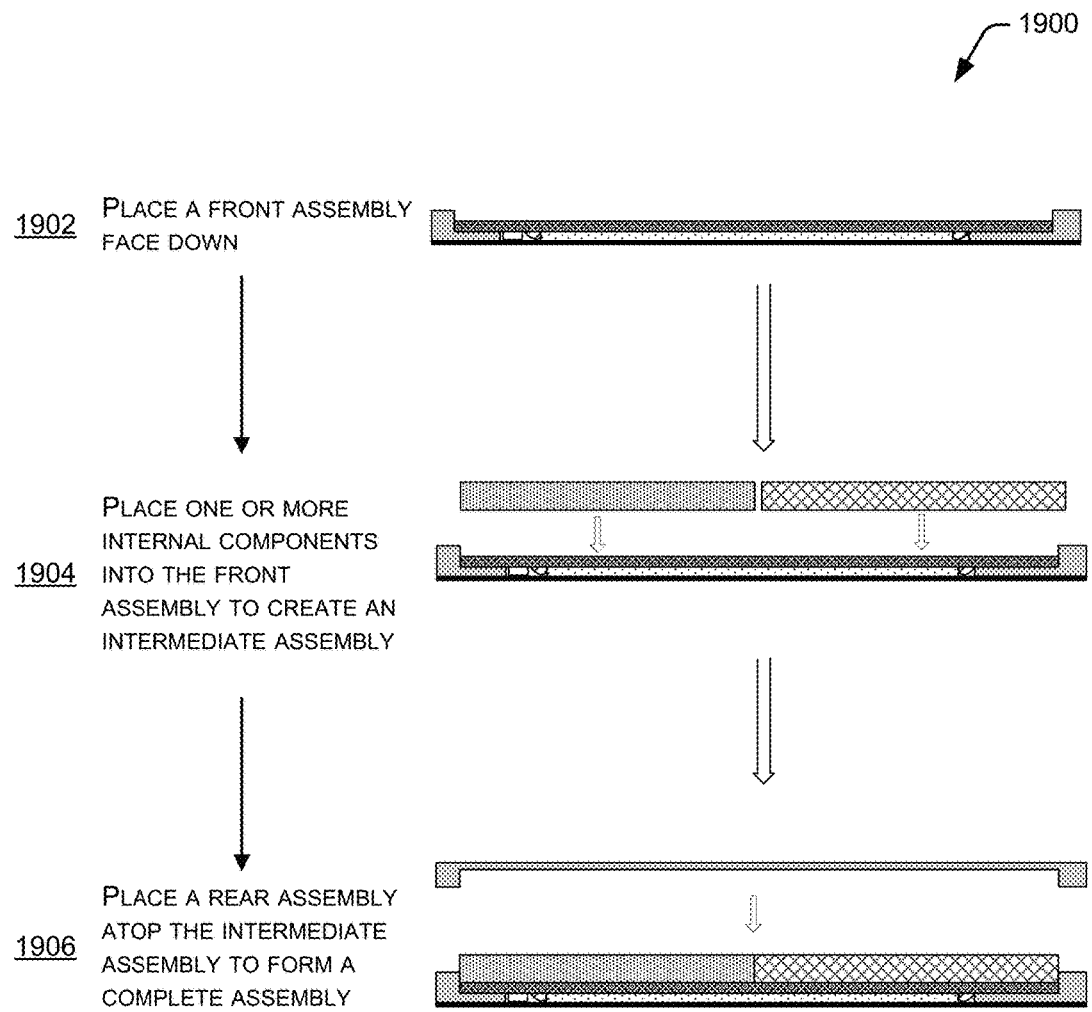
FIG. 19 is an illustrative process of assembling an eBook reader device which incorporates a surface display assembly.

FIG. 19 is an illustrative process 1900 of assembling an eBook reader device that incorporates a surface display assembly. This process 1900 is illustrated as a collection of blocks in a logical flow graph, which represent a sequence of operations that can be implemented in hardware, software, or a combination thereof. In the context of software, the blocks represent computer-executable instructions stored on one or more computer-readable storage media that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Operation 1902 places a front assembly, facedown, on a work surface. This front assembly comprises a display layer and a protective sheet. Operation 1904 places one or more internal components into the front assembly to create an intermediate assembly. Internal components include processors, batteries, structural elements such as internal frames, and so forth.

Operation 1906 places a rear assembly atop the intermediate assembly, thus enclosing at least a portion of the internal components and forming the complete assembly. This formation may include joining or bonding the front assembly to the rear assembly, one or more of the internal components to both the front assembly and rear assembly, and so forth.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic book reader device comprising:
   a processor;
   a memory coupled to the processor;
   a display coupled to the processor, the display comprising:
      a display layer to display content and having a perimeter, a display surface, and a back surface approximately parallel to the display surface;
      at least one of first traces or first wires of a first layer of a crosspoint array disposed directly on the back surface of the display layer such that the display layer provides a substrate for the first layer of the crosspoint array;
      a frame disposed at least partially around the perimeter of the display layer and the first layer of the crosspoint array;
      a continuous transparent protective sheet extending over and covering the display surface and a top surface of the frame; and
   a rear assembly including a battery pack and at least one of second traces or second wires of a second layer of the crosspoint array disposed directly on a top surface of the rear assembly, at least a portion of the second layer of the crosspoint array contacting at least a portion of the first layer of the crosspoint array, and the top surface of the rear assembly providing an additional substrate for the second layer of the crosspoint array.

2. The electronic book reader device of claim 1, wherein the transparent protective sheet is affixed to the display surface of the display layer with an optically compatible adhesive.

3. The electronic book reader device of claim 1, wherein the transparent protective sheet comprises polyethylene terephthalate.

4. A device comprising:
   a display layer disposed upon a substrate and having a perimeter and a display surface to display content;
   a crosspoint array having at least a first layer and a second layer, the first layer having at least one of first traces or first wires integrated with the display surface of the display layer such that the display layer provides a first additional substrate for the first layer of the crosspoint array;
   a frame residing around at least a portion of the perimeter of the display layer and engaging the substrate such that a top surface of the frame is flush with the display surface; and
   a transparent protective sheet extending from at least a portion of the top surface of the frame to at least a portion of the display surface of the display layer, the transparent protective sheet including at least one of second traces or second wires of the second layer of the crosspoint array integrated with a surface of the transparent protective sheet and at least a portion of the second layer of the crosspoint array contacting at least a portion of the first layer of the crosspoint array, wherein the transparent protective sheet provides a second additional substrate for the second layer of the crosspoint array.

5. The device of claim 4, wherein the display layer comprises an electrophoretic display.

6. The device of claim 4, wherein the transparent protective sheet includes an icon printed thereon.

7. The device of claim 6, wherein a location of the icon on the transparent protective sheet corresponds to a control of the device to receive user input to operate the device.

8. The device of claim 4, wherein the transparent protective sheet includes an identifying design printed thereon.

9. The device of claim 4, wherein the transparent protective sheet is bonded to the display layer and the top surface of the frame.

10. The device of claim 4, wherein the frame engages a bottom surface of the substrate, and the at least one of first traces or first wires are disposed approximately over interpixel dead spaces of the display layer.

11. The device of claim 4, wherein the substrate includes a top surface that faces in a same direction as the top surface of the frame, and wherein the frame engages the top surface of the substrate.

12. The device of claim 4, further comprising filler inserted between the transparent protective sheet and one or more underlying components of the device.

13. The device of claim 12, wherein the filler comprises a room-temperature vulcanizing silicone compound.

14. A device comprising:
- a display having a display surface to display content and a bottom surface disposed approximately parallel to the display surface, a first layer of a crosspoint array including at least one of first traces or first wires disposed on the bottom surface of the display such that the display provides a substrate for the first layer of the crosspoint array;
- a frame affixed to the display, the frame having at least a portion residing around a perimeter of the display; and
- a battery pack including a second layer of the crosspoint array including at least one of second traces or second wires disposed on a top surface of the battery pack, at least a portion of the second layer of the crosspoint array contacting at least a portion of the first layer of the crosspoint array and the top surface of the battery pack providing an additional substrate for the second layer of the crosspoint array.

15. The device of claim 14, further comprising:
- a transparent protective sheet bonded to and covering the display surface and an entirety of the frame; and
- a mask printed on the transparent protective sheet, the mask configured to conceal underlying components while leaving an active display area transparent.

16. The device of claim 14, wherein the first layer of the crosspoint array and the second layer of the crosspoint array form a touch sensor.

17. A device comprising:
- a display component having a display surface to display content and a first layer of a crosspoint array, the first layer of the crosspoint array including at least one of first traces or first wires disposed on a bottom surface of the display component and forming at least a portion of a touch sensor, the bottom surface of the display component being disposed approximately parallel to the display surface and the display component providing a substrate for the first layer of the crosspoint array;
- a frame disposed around at least a portion of the display component such that a top surface of the frame is substantially flush with the display surface of the display component; and
- a battery pack including a second layer of the crosspoint array including at least one of second traces or second wires disposed on a top surface of the battery pack, at least a portion of the second layer of the crosspoint array contacting at least a portion of the first layer of the crosspoint array and the top surface of the battery pack providing an additional substrate for the second layer of the crosspoint array.

18. The device of claim 17, further comprising a sealant between the display component and at least a portion of the frame.

19. The device of claim 17, further comprising a protective sheet bonded to and covering the display surface and the frame, wherein the protective sheet is continuous.

20. A device comprising:
- a front assembly comprising:
  - a frame,
  - a display having a display surface that is substantially flush with a top surface of the frame,
  - a protective sheet that is affixed to the display surface and at least a portion of the top surface of the frame, and
  - a first layer of a crosspoint array including at least one of first traces or first wires disposed on a bottom surface of the display, the bottom surface of the display disposed approximately parallel to the display surface, wherein the display provides a substrate for the first layer of the crosspoint array; and
- an intermediate component comprising:
  - a battery, and
  - a second layer of the crosspoint array including at least one of second traces or second wires disposed on a top surface of the intermediate component, wherein the first layer of the crosspoint array and the second layer of the crosspoint array form a touch sensor and the intermediate component provides an additional substrate for the second layer of the crosspoint array.

21. The device of claim 20, further comprising a rear assembly, wherein the front assembly is joined to the rear assembly.

22. The device of claim 20, wherein the device comprises at least one of an electronic book reader device or a tablet computing device.

23. The device of claim 20, wherein the protective sheet is continuous and covers an entirety of the display surface and an entirety of the top surface of the frame.

* * * * *

UNITED STATES PATENT AND TRADEMARK OFFICE
CERTIFICATE OF CORRECTION

PATENT NO.       : 9,819,815 B1
APPLICATION NO.  : 12/823746
DATED            : November 14, 2017
INVENTOR(S)      : Amish Rajesh Babu et al.

It is certified that error appears in the above-identified patent and that said Letters Patent is hereby corrected as shown below:

On the Title Page

Correct spelling of inventor name from Shyeu-Yang Wang to Shyue-Yang Wang.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*